United States Patent
Fujii

(10) Patent No.: US 8,933,165 B2
(45) Date of Patent: Jan. 13, 2015

(54) METHOD FOR PRODUCING MODIFIED CONJUGATED DIENE-BASED POLYMER, AND METHOD FOR PRODUCING POLYMER COMPOSITION

(71) Applicant: Sumitomo Chemical Company, Limited, Chuo-ku, Tokyo (JP)

(72) Inventor: Mana Fujii, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/035,390

(22) Filed: Sep. 24, 2013

(65) Prior Publication Data

US 2014/0088242 A1    Mar. 27, 2014

(30) Foreign Application Priority Data

Sep. 26, 2012 (JP) .................. 2012-211887

(51) Int. Cl.
*C08F 8/30*    (2006.01)

(52) U.S. Cl.
CPC ....................................... *C08F 8/30* (2013.01)
USPC ......................................... 524/575; 525/375

(58) Field of Classification Search
None
See application file for complete search history.

(56) References Cited

U.S. PATENT DOCUMENTS

| | | | | |
|---|---|---|---|---|
| 4,097,557 A * | 6/1978 | Cunningham | ................. | 525/250 |
| 4,647,625 A * | 3/1987 | Aonuma et al. | ................. | 525/232 |
| 5,218,023 A * | 6/1993 | Horikawa et al. | ............... | 524/210 |
| 5,652,310 A | 7/1997 | Hsu et al. | | |
| 5,658,987 A * | 8/1997 | Nakamura et al. | ............... | 525/99 |
| 6,111,045 A * | 8/2000 | Takagishi et al. | ............... | 526/338 |
| 6,211,321 B1 * | 4/2001 | Takagishi et al. | ............... | 526/335 |
| 7,683,111 B2 * | 3/2010 | Hogan et al. | .................. | 524/106 |
| 8,071,676 B2 * | 12/2011 | Matsuda et al. | ............... | 524/572 |
| 8,299,179 B2 * | 10/2012 | Ito et al. | ........................ | 525/102 |
| 8,334,339 B2 * | 12/2012 | Ito et al. | ........................ | 524/547 |
| 8,367,765 B2 * | 2/2013 | Ito et al. | ........................ | 524/547 |
| 2004/0132907 A1 * | 7/2004 | Nakamura et al. | ............... | 525/88 |
| 2005/0256264 A1 * | 11/2005 | Suzuki et al. | .................. | 525/88 |
| 2012/0252966 A1 | 10/2012 | Ito | | |

FOREIGN PATENT DOCUMENTS

| | | | |
|---|---|---|---|
| JP | H06-279544 A | 10/1994 | |
| JP | H10-007702 A | 1/1998 | |

* cited by examiner

*Primary Examiner* — Robert S Loewe
(74) *Attorney, Agent, or Firm* — Panitch Schwarze Belisario & Nadel LLP

(57) ABSTRACT

The present invention related to a method for producing a modified conjugated diene-based polymer, the method comprising a step of reacting a conjugated diene-based polymer with an organometallic compound, and a step of reacting the resulting product and a compound containing a nitrogen atom and a carbonyl group.

2 Claims, No Drawings

METHOD FOR PRODUCING MODIFIED CONJUGATED DIENE-BASED POLYMER, AND METHOD FOR PRODUCING POLYMER COMPOSITION

BACKGROUND OF THE INVENTION

1. Field of the Invention

The present invention relates to a method for producing a modified conjugated diene-based polymer and a method for producing a polymer composition using the polymer.

2. Background Art

In recent years, with an increase of interest in the environmental problems, improvement in fuel economy has strongly been required on automobiles, and a rubber composition to be used for automotive tires is also required to be superior in fuel economy. As a rubber composition for automotive tires, rubber compositions containing a conjugated diene-based polymer such as polybutadiene or a styrene-butadiene copolymer, and a reinforcing agent are used. The use of a silica reinforcing agent in place of carbon black, which has heretofore been used as a reinforcing agent, has been studied in order to improve performance as a rubber composition for tires.

Silica reinforcing agents are lower in affinity with conjugated diene-based polymers as compared with carbon black. Improvement in fuel economy has believed to require to enhance affinity between silica reinforcing agents and conjugated diene-based polymers. In order to enhance affinity between silica reinforcing agents and conjugated diene-based polymers, JP-A-10-7702, for example, proposes a method in which isoprene and butadiene are polymerized using n-butyllithium, n-butyllithium is then reacted with the resulting polymer to perform metallization of a vinyl group possessed by a side chain of the polymer, and thereafter chloropropyltriethoxysilane is reacted with the resultant metalized polymer to obtain a modified conjugated diene-based polymer.

SUMMARY OF THE INVENTION

Rubber compositions containing modified conjugated diene-based polymers produced by the above-cited method disclosed JP-A-10-7702, however, are still unsatisfactory in fuel economy.

Under such circumstances, the problem to be solved by the present invention is to provide a method for producing a modified conjugated diene-based polymer capable of affording a polymer composition superior in fuel economy, and a method for producing a polymer composition using the polymer.

The present invention relates to a method for producing a modified conjugated diene-based polymer, the method comprising a step of reacting a conjugated diene-based polymer having monomer units derived from a conjugated diene compound, monomer units derived from a compound represented by Formula (1) and monomer units derived from a compound represented by Formula (2), with an organometallic compound, and a step of reacting a compound having a nitrogen atom and a carbonyl group with the resulting product, wherein the conjugated diene-based polymer comprises the monomer units derived from the compound represented by Formula (1) in a content of from 0.01% by weight to 10% by weight where the total amount of all the monomer units contained in the conjugated diene-based polymer is taken as 100% by weight;

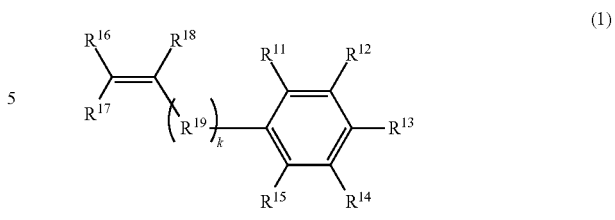

wherein $R^{11}$, $R^{12}$, $R^{13}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$, $R^{17}$ and $R^{18}$ each independently represent a hydrogen atom or a hydrocarbyl group; $R^{19}$ represents a hydrocarbylene group; k is 0 or 1,

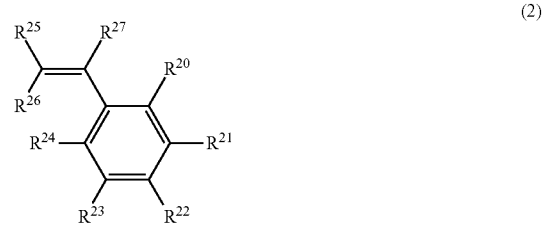

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $R^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group.

A second aspect of the present invention relates to a method for producing a polymer composition, the method comprising a step of kneading 100 parts by weight of a modified conjugated diene-based polymer produced by the above-mentioned method with from 10 to 150 parts by weight of a reinforcing agent.

According to the present invention, a modified conjugated diene-based polymer suitable for the preparation of a polymer composition superior in fuel economy can be provided.

DETAILED DESCRIPTION OF THE PREFERRED EMBODIMENTS

In the present specification, a hydrocarbyl group represents a monovalent group obtained by removing one hydrogen atom from a hydrocarbon. A hydrocarbylene group represents a divalent group obtained by removing two hydrogen atoms from a hydrocarbon. A hydrocarbyloxy group represents a monovalent group having a structure in which a hydrogen atom of a hydroxy group has been substituted with a hydrocarbyl group. An amino group having a substituent (hereinafter sometimes referred to as a substituted amino group) represents a group having a structure in which at least one hydrogen atom of an amino group has been substituted with a monovalent atom or a monovalent group other than a hydrogen atom, or a group having a structure in which two hydrogen atoms of an amino group have been substituted with a divalent group. A hydrocarbyl group having a substituent (hereinafter sometimes referred to as a substituted hydrocarbyl group) represents a monovalent group having a structure in which at least one hydrogen atom of a hydrocarbyl group has been substituted with a substituent. A hydrocarbylene group having a heteroatom (hereinafter sometimes referred to as a heteroatom-containing hydrocarbylene group) represents a divalent group having a structure in which a carbon atom other than a carbon atom from which a hydrogen atom has been removed, and/or a hydrogen atom of a hydrocarbylene group has been substituted with a group having a heteroatom (an atom other than a carbon atom and a hydrogen atom).

[Process for Producing Modified Conjugated Diene-Based Polymer]

The method for producing a modified conjugated diene-based polymer of the present invention relates to a method for producing a modified conjugated diene-based polymer, the method comprising a step of reacting a conjugated diene-based polymer having monomer units derived from a conjugated diene compound, monomer units derived from a compound represented by Formula (1) and monomer units derived from a compound represented by Formula (2), with an organometallic compound, and a step of reacting a compound having a nitrogen atom and a carbonyl group with the resulting product, wherein the conjugated diene-based polymer comprises the monomer units derived from the compound represented by Formula (1) in a content of from 0.01% by weight to 10% by weight where the total amount of all the monomer units contained in the conjugated diene-based polymer is taken as 100% by weight;

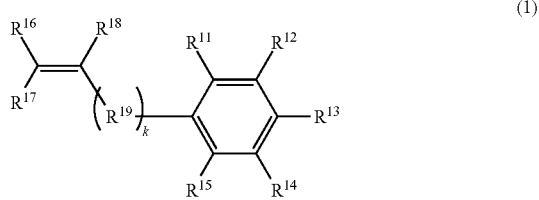

(1)

wherein $R^{11}$, $R^{12}$, $R^{13}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$, $R^{17}$ and $R^{18}$ each independently represent a hydrogen atom or a hydrocarbyl group; $R^{19}$ represents a hydrocarbylene group; k is 0 or 1,

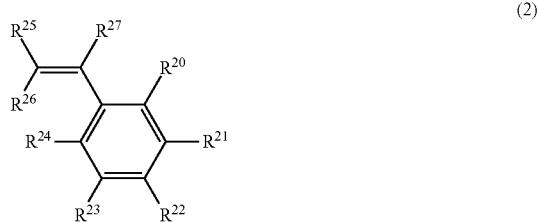

(2)

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $R^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group.

<Conjugated Diene-Based Polymer>

The conjugated diene-based polymer has a monomer unit derived from a conjugated diene compound, a monomer unit derived from a compound represented by Formula (1), and a monomer unit derived from a compound represented by Formula (2).

Examples of the conjugated diene compound include 1,3-butadiene, isoprene, 1,3-pentadiene, 2,3-dimethyl-1,3-butadiene, and 1,3-hexadiene. One or more members of them are used. 1,3-Butadiene or isoprene is preferred.

In Formula (1), $R^{11}$, $R^{12}$, $R^{13}$, $R^{14}$ and $R^{15}$ each independently represent a hydrogen atom or an alkyl group, and at least one of $R^{11}$, $R^{12}$, $R^{13}$, $R^{14}$ and $R^{15}$ is an alkyl group.

The number of the carbon atoms of each of the alkyl groups of $R^{11}$, $R^{12}$, $R^{13}$, $R^{14}$ and $R^{15}$ is preferably 1 to 8, more preferably 1 to 5, even more preferably 1 to 2, particularly preferably 1.

Examples of the alkyl groups of $R^{11}$, $R^{12}$, $R^{13}$, $R^{14}$ and $R^{15}$ include a methyl group, an ethyl group, a propyl group, an isopropyl group, a butyl group, an isobutyl group, a sec-butyl group, a pentyl group, a hexyl group, a heptyl group, and an octyl group.

Each of the alkyl groups of $R^{11}$, $R^{12}$, $R^{13}$, $R^{14}$ and $R^{15}$ is preferably an alkyl group which is bound to a benzene ring via a carbon atom to which one or more hydrogen atoms are bound, more preferably an alkyl group which is bound to a benzene ring via a carbon atom to which two or more hydrogen atoms are bound, even more preferably a linear alkyl group.

Each of the alkyl groups of $R^{11}$, $R^{12}$, $R^{13}$, $R^{14}$ and $R^{15}$ is preferably a methyl group, an ethyl group, a n-propyl group, a n-butyl group, or a n-pentyl group, more preferably a methyl group or an ethyl group, even more preferably a methyl group.

Preferably, one to three groups selected from $R^{11}$, $R^{12}$, $R^{13}$, $R^{14}$ and $R^{15}$ are alkyl groups, and the remaining groups are hydrogen atoms. More preferably, one or two groups selected from $R^{11}$, $R^{12}$, $R^{13}$, $R^{14}$ and $R^{15}$ are alkyl groups, and the remaining groups are hydrogen atoms.

When one group selected from $R^{11}$, $R^{12}$, $R^{13}$, $R^{14}$ and $R^{15}$ is an alkyl group and the remaining four groups are hydrogen atoms, preferably any one group of $R^{12}$, $R^{13}$ and $R^{14}$ is an alkyl group and the remaining four groups are hydrogen atoms.

When two groups selected from $R^{11}$, $R^{12}$, $R^{13}$, $R^{14}$ and $R^{15}$ are alkyl groups and the remaining three groups are hydrogen atoms, preferably, $R^{11}$ and $R^{13}$ are alkyl groups and $R^{12}$, $R^{14}$ and $R^{15}$ are hydrogen atoms, or $R^{11}$ and $R^{14}$ are alkyl groups and $R^{12}$, $R^{13}$ and $R^{15}$ are hydrogen atoms, or $R^{12}$ and $R^{14}$ are alkyl groups and $R^{11}$, $R^{13}$ and $R^{15}$ are hydrogen atoms.

When three groups selected from $R^{11}$, $R^{12}$, $R^{13}$, $R^{14}$ and $R^{15}$ are alkyl groups and the remaining two groups are hydrogen atoms, preferably, $R^{11}$, $R^{13}$ and $R^{15}$ are alkyl groups and $R^{12}$ and $R^{14}$ are hydrogen atoms.

In Formula (1), $R^{16}$, $R^{17}$ and $R^{18}$ each independently represent a hydrogen atom or a hydrocarbyl group. Examples of the hydrocarbyl group include an alkyl group, an alkenyl group, an aryl group, and an arylalkyl group. Examples of the alkyl group include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, and a n-octyl group. Examples of the alkenyl group include a vinyl group, a 1-propenyl group, 2-propenyl group, an isopropenyl group, and a 1-butenyl group. Examples of the aryl group include a phenyl group, a tolyl group, a xylyl group, and a naphthyl group. Examples of the arylalkyl group include a benzyl group and a 2-phenyl-1-ethyl group.

When $R^{16}$ or $R^{17}$ is a hydrocarbyl group, the $R^{16}$ or $R^{17}$ is preferably an alkyl group or an alkenyl group, more preferably an alkenyl group. When $R^{18}$ is a hydrocarbyl group, the $R^{18}$ is preferably an alkyl group, an alkenyl group, or an aryl group.

When $R^{16}$, $R^{17}$ or $R^{18}$ is a hydrocarbyl group, the number of the carbon atoms of the $R^{16}$, $R^{17}$ or $R^{18}$ is preferably 1 to 10. When $R^{16}$, $R^{17}$ or $R^{18}$ is an alkyl group, the number of the carbon atoms of the $R^{16}$, $R^{17}$ or $R^{18}$ is preferably 1 to 6, and more preferably 1 to 2; when $R^{16}$, $R^{17}$, or $R^{18}$ is an alkenyl group, the number of the carbon atoms of the $R^{16}$, $R^{17}$ or $R^{18}$ is preferably 2 to 6, and more preferably 2; and when $R^{16}$, $R^{17}$ or $R^{18}$ is an aryl group, the number of the carbon atoms of the $R^{16}$, $R^{17}$ or $R^{18}$ is more preferably 6 to 8.

$R^{16}$ or $R^{17}$ is preferably a hydrogen atom or an alkenyl group having 2 to 6 carbon atoms, more preferably a hydrogen atom or a vinyl group, even more preferably a hydrogen atom.

$R^{18}$ is preferably a hydrogen atom, an alkyl group having 1 to 6 carbon atoms, an alkenyl group having 2 to 6 carbon atoms, or an aryl group having 6 to 8 carbon atoms, more preferably a hydrogen atom, a methyl group, a vinyl group, or a phenyl group, even more preferably a hydrogen atom.

In Formula (1), k represents 0 or 1, preferably 0.

In Formula (1), $R^{19}$ represents a hydrocarbylene group. Examples of the hydrocarbylene group include an alkanediyl group and an arylene group. Examples of the alkanediyl group include a methylene group and a polymethylene group. Examples of the polymethylene group include an ethylene group, a trimethylene group, a tetramethylene group, a pentamethylene group, and a hexamethylene group. Examples of the arylene group include a phenylene group.

The number of the carbon atoms of $R^{19}$ is preferably 1 to 8, more preferably 1 to 5, even more preferably 1 to 3.

$R^{19}$ is preferably an alkanediyl group having 1 to 8 carbon atoms, more preferably a methylene group, or a polymethylene group having 2 to 5 carbon atoms, even more preferably a methylene group, an ethylene group, or a trimethylene group.

Of the compounds represented by Formula (1), examples of a compound in which $R^{16}$, $R^{17}$ and $R^{18}$ are hydrogen atoms, k is 0, one group selected from $R^{11}$, $R^{12}$, $R^{13}$, $R^{14}$ and $R^{15}$ is an alkyl group and the remaining four groups are hydrogen atoms include 2-methylstyrene, 2-ethylstyrene, 2-propylstyrene, 2-butylstyrene, 2-pentylstyrene, 2-hexylstyrene, 3-methylstyrene, 3-ethylstyrene, 3-propylstyrene, 3-butylstyrene, 3-pentylstyrene, 3-hexylstyrene, 4-methylstyrene, 4-ethylstyrene, 4-propylstyrene, 4-butylstyrene, 4-pentylstyrene, and 4-hexylstyrene.

Of the compounds represented by Formula (1), examples of a compound in which $R^{16}$, $R^{17}$ and $R^{18}$ are hydrogen atoms, k is 0, two groups selected from $R^{11}$, $R^{12}$, $R^{13}$, $R^{14}$ and $R^{15}$ are alkyl groups and the remaining three groups are hydrogen atoms include 2,3-dimethylstyrene, 2,3-diethylstyrene, 2,3-dipropylstyrene, 2,3-dibutylstyrene, 2,3-pentylstyrene, 2,3-hexylstyrene, 2-methyl-3-ethylstyrene, 2-ethyl-3-methylstyrene, 2,4-dimethylstyrene, 2,4-diethylstyrene, 2,4-dipropylstyrene, 2,4-dibutylstyrene, 2,4-dipentylstyrene, 2,4-dihexylstyrene, 2-methyl-4-ethylstyrene, 2-ethyl-4-methylstyrene, 2,5-dimethylstyrene, 2,5-diethylstyrene, 2,5-dipropylstyrene, 2,5-dibutylstyrene, 2,5-dipentylstyrene, 2,5-dihexylstyrene, 2-methyl-5-ethylstyrene, 2-ethyl-5-methylstyrene, 2,6-dimethylstyrene, 2,6-diethylstyrene, 2,6-dipropylstyrene, 2,6-dibutylstyrene, 2,6-dipentylstyrene, 2,6-dihexylstyrene, 2-methyl-6-ethylstyrene, 2-ethyl-6-methylstyrene, 3,4-dimethylstyrene, 3,4-diethylstyrene, 3,4-dipropylstyrene, 3,4-dibutylstyrene, 3,4-dipentylstyrene, 3,4-dihexylstyrene, 3-methyl-4-ethylstyrene, 3-ethyl-4-methylstyrene, 3,5-dimethylstyrene, 3,5-diethylstyrene, 3,5-dipropylstyrene, 3,5-dibutylstyrene, 3,5-dipentylstyrene, 3,5-dihexylstyrene, 3-methyl-5-ethylstyrene, and 3-ethyl-5-methylstyrene.

Of the compounds represented by Formula (1), examples of a compound in which $R^{16}$, $R^{17}$ and $R^{18}$ are hydrogen atoms, k is 0, three groups selected from $R^{11}$, $R^{12}$, $R^{13}$, $R^{14}$ and $R^{15}$ are alkyl groups and the remaining two groups are hydrogen atoms include 2,3,4-trimethylstyrene, 2,3,4-triethylstyrene, 2,3,4-tripropylstyrene, 2,3,4-tributylstyrene, 2,3,4-tripentylstyrene, 2,3,4-trihexylstyrene, 2,3,5-trimethylstyrene, 2,3,5-triethylstyrene, 2,3,5-tripropylstyrene, 2,3,5-tributylstyrene, 2,3,5-tripentylstyrene, 2,3,5-trihexylstyrene, 2,3,6-trimethylstyrene, 2,3,6-triethylstyrene, 2,3,6-tripropylstyrene, 2,3,6-tributylstyrene, 2,3,6-tripentylstyrene, 2,3,6-trihexylstyrene, 2,4,5-trimethylstyrene, 2,4,5-triethylstyrene, 2,4,5-tripropylstyrene, 2,4,5-tributylstyrene, 2,4,5-tripentylstyrene, 2,4,5-trihexylstyrene, 2,4,6-trimethylstyrene, 2,4,6-triethylstyrene, 2,4,6-tripropylstyrene, 2,4,6-tributylstyrene, 2,4,6-tripentylstyrene, 2,4,6-trihexylstyrene, 3,4,5-trimethylstyrene, 3,4,5-triethylstyrene, 3,4,5-tripropylstyrene, 3,4,5-tributylstyrene, 3,4,5-tripentylstyrene, and 3,4,5-trihexylstyrene.

Of the compounds represented by Formula (1), examples of a compound in which $R^{16}$, $R^{17}$ and $R^{18}$ are hydrogen atoms, k is 1, $R^{19}$ is a methylene group, one group selected from $R^{11}$, $R^{12}$, $R^{13}$, $R^{14}$ and $R^{15}$ is an alkyl group and the remaining four groups are hydrogen atoms include 2-methyl-1-(2-propenyl)benzene, 2-ethyl-1-(2-propenyl)benzene, 2-propyl-1-(2-propenyl)benzene, 2-butyl-1-(2-propenyl)benzene, 3-methyl-1-(2-propenyl)benzene, 3-ethyl-1-(2-propenyl)benzene, 3-propyl-1-(2-propenyl)benzene, 3-butyl-1-(2-propenyl)benzene, 4-methyl-1-(2-propenyl)benzene, 4-ethyl-1-(2-propenyl)benzene, 4-propyl-1-(2-propenyl)benzene, and 4-butyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is a methylene group, two groups selected from $R^{11}$, $R^{12}$, $R^{13}$, $R^{14}$ and $R^{15}$ are alkyl groups having 1 to 8 carbon atoms and the remaining three groups are hydrogen atoms include 2,3-dimethyl-1-(2-propenyl)benzene, 2,3-diethyl-1-(2-propenyl)benzene, 2,3-dipropyl-1-(2-propenyl)benzene, 2,3-dibutyl-1-(2-propenyl)benzene, 2,4-dimethyl-1-(2-propenyl)benzene, 2,4-diethyl-1-(2-propenyl)benzene, 2,4-dipropyl-1-(2-propenyl)benzene, 2,4-dibutyl-1-(2-propenyl)benzene, 2,5-dimethyl-1-(2-propenyl)benzene, 2,5-diethyl-1-(2-propenyl)benzene, 2,5-dipropyl-1-(2-propenyl)benzene, 2,5-dibutyl-1-(2-propenyl)benzene, 2,6-dimethyl-1-(2-propenyl)benzene, 2,6-diethyl-1-(2-propenyl)benzene, 2,6-dipropyl-1-(2-propenyl)benzene, 2,6-dibutyl-1-(2-propenyl)benzene, 3,4-dimethyl-1-(2-propenyl)benzene, 3,4-diethyl-1-(2-propenyl)benzene, 3,4-dipropyl-1-(2-propenyl)benzene, 3,4-dibutyl-1-(2-propenyl)benzene, 3,5-dimethyl-1-(2-propenyl)benzene, 3,5-diethyl-1-(2-propenyl)benzene, 3,5-dipropyl-1-(2-propenyl)benzene, and 3,5-dibutyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is a methylene group, three groups selected from $R^{11}$, $R^{12}$, $R^{13}$, $R^{14}$ and $R^{15}$ are alkyl groups and the remaining two groups are hydrogen atoms include 2,3,4-trimethyl-1-(2-propenyl)benzene, 2,3,4-triethyl-1-(2-propenyl)benzene, 2,3,5-trimethyl-1-(2-propenyl)benzene, 2,3,5-triethyl-1-(2-propenyl)benzene, 2,3,6-trimethyl-1-(2-propenyl)benzene, 2,3,6-triethyl-1-(2-propenyl)benzene, 2,4,5-trimethyl-1-(2- propenyl)benzene, 2,4,5-triethyl-1-(2-propenyl)benzene, 2,4,6-trimethyl-1-(2-propenyl)benzene, 2,4,6-triethyl-1-(2-propenyl)benzene, 3,4,5-trimethyl-1-(2-propenyl)benzene, and 3,4,5-triethyl-1-(2-propenyl)benzene.

Of the compounds represented by Formula (1), examples of a compound in which $R^{16}$, $R^{17}$ and $R^{18}$ are hydrogen atoms, k is 1, $R^{19}$ is an ethylene group, one group selected from $R^{11}$, $R^{12}$, $R^{13}$, $R^{14}$ and $R^{15}$ is an alkyl group and the remaining four groups are hydrogen atoms include 2-methyl-1-(3-butenyl) benzene, 2-ethyl-1-(3-butenyl)benzene, 2-propyl-1-(3-butenyl)benzene, 2-butyl-1-(3-butenyl)benzene, 3-methyl-1-(3-butenyl)benzene, 3-ethyl-1-(3-butenyl)benzene, 3-propyl-1-(3-butenyl)benzene, 3-butyl-1-(3-butenyl)benzene, 4-methyl-1-(3-butenyl)benzene, 4-ethyl-1-(3-butenyl)benzene, 4-propyl-1-(3-butenyl)benzene, and 4-butyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is an ethylene group, two groups selected from $R^{11}$, $R^{12}$, $R^{13}$, $R^{14}$ and $R^{15}$ are alkyl groups and the remaining three groups are hydrogen atoms include 2,3-dimethyl-1-(3-butenyl)benzene, 2,3-diethyl-1-(3-butenyl)benzene, 2,3-dipropyl-1-(3-butenyl)benzene, 2,3-dibutyl-1-(3-butenyl)benzene, 2,4-dimethyl-1-(3-butenyl)benzene, 2,4-diethyl-1-(3-butenyl)benzene, 2,4-dipropyl-1-(3-butenyl)benzene, 2,4-dibutyl-1-(3-butenyl)benzene, 2,5-dimethyl-1-(3-butenyl)benzene, 2,5-diethyl-1-(3-butenyl)benzene, 2,5-dipropyl-1-(3-butenyl)benzene, 2,5-dibutyl-1-(3-butenyl)benzene, 2,6-dimethyl-1-(3-butenyl)benzene, 2,6-diethyl-1-(3-butenyl)benzene, 2,6-dipropyl-1-(3-butenyl)benzene, 2,6-dibutyl-1-(3-butenyl)benzene, 3,4-dimethyl-1-(3-butenyl)benzene, 3,4-diethyl-1-(3-butenyl)benzene, 3,4-dipropyl-1-(3-butenyl)benzene, 3,4-dibutyl-1-(3-butenyl)benzene, 3,5-dimethyl-1-(3-butenyl)benzene, 3,5-diethyl-1-(3-butenyl)benzene, 3,5-dipropyl-1-(3-butenyl)benzene, and 3,5-dibutyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is an ethylene group, three groups selected from $R^{11}$, $R^{12}$, $R^{13}$, $R^{14}$ and $R^{15}$ are alkyl groups and the remaining two groups are hydrogen atoms include 2,3,4-trimethyl-1-(3-butenyl)benzene, 2,3,4-triethyl-1-(3-butenyl)benzene, 2,3,5-trimethyl-1-(3-butenyl)benzene, 2,3,5-triethyl-1-(3-butenyl) benzene, 2,3,6-trimethyl-1-(3-butenyl)benzene, 2,3,6-triethyl-1-(3-butenyl)benzene, 2,4,5-trimethyl-1-(3-butenyl) benzene, 2,4,5-triethyl-1-(3-butenyl)benzene, 2,4,6-trimethyl-1-(3-butenyl)benzene, 2,4,6-triethyl-1-(3-butenyl) benzene, 3,4,5-trimethyl-1-(3-butenyl)benzene, and 3,4,5-triethyl-1-(3-butenyl)benzene.

Of the compounds represented by Formula (1), examples of a compound in which $R^{16}$, $R^{17}$ and $R^{18}$ are hydrogen atoms, k is 1, $R^{19}$ is a trimethylene group, one group selected from $R^{11}$, $R^{12}$, $R^{13}$, $R^{14}$ and $R^{15}$ is an alkyl group and the remaining four groups are hydrogen atoms include 2-methyl-1-(4-pentenyl)benzene, 2-ethyl-1-(4-pentenyl)benzene, 2-propyl-1-(4-pentenyl)benzene, 2-butyl-1-(4-pentenyl)benzene, 3-methyl-1-(4-pentenyl)benzene, 3-ethyl-1-(4-pentenyl)benzene, 3-propyl-1-(4-pentenyl)benzene, 3-butyl-1-(4-pentenyl)benzene, 4-methyl-1-(4-pentenyl)benzene, 4-ethyl-1-(4-pentenyl)benzene, 4-propyl-1-(4-pentenyl)benzene, and 4-butyl-1-(4-pentenyl)benzene.

Of the compounds represented by Formula (1), examples of a compound in which $R^{16}$, $R^{17}$ and $R^{18}$ are hydrogen atoms, k is 1, $R^{19}$ is an ethylene group, two groups selected from $R^{11}$, $R^{12}$, $R^{13}$, $R^{14}$ and $R^{15}$ are alkyl groups and the remaining three groups are hydrogen atoms include 2,3-dimethyl-1-(4-pentenyl)benzene, 2,3-diethyl-1-(4-pentenyl)benzene, 2,3-dipropyl-1-(4-pentenyl)benzene, 2,3-dibutyl-1-(4-pentenyl)benzene, 2,4-dimethyl-1-(4-pentenyl)benzene, 2,4-diethyl-1-(4-pentenyl)benzene, 2,4-dipropyl-1-(4-pentenyl)benzene, 2,4-dibutyl-1-(4-pentenyl)benzene, 2,5-dimethyl-1-(4-pentenyl) benzene, 2,5-diethyl-1-(4-pentenyl)benzene, 2,5-dipropyl-1-(4-pentenyl)benzene, 2,5-dibutyl-1-(4-pentenyl)benzene, 2,6-dimethyl-1-(4-pentenyl)benzene, 2,6-diethyl-1-(4-pentenyl)benzene, 2,6-dipropyl-1-(4-pentenyl)benzene, 2,6-dibutyl-1-(4-pentenyl)benzene, 3,4-dimethyl-1-(4-pentenyl) benzene, 3,4-diethyl-1-(4-pentenyl)benzene, 3,4-dipropyl-1-(4-pentenyl)benzene, 3,4-dibutyl-1-(4-pentenyl)benzene, 3,5-dimethyl-1-(4-pentenyl)benzene, 3,5-diethyl-1-(4-pentenyl)benzene, 3,5-dipropyl-1-(4-pentenyl)benzene, and 3,5-dibutyl-1-(4-pentenyl)benzene.

Of the compounds represented by Formula (1), examples of a compound in which $R^{16}$, $R^{17}$ and $R^{18}$ are hydrogen atoms, k is 1, $R^{19}$ is an ethylene group, three groups selected from $R^{11}$, $R^{12}$, $R^{13}$, $R^{14}$ and $R^{15}$ are alkyl groups and the remaining two groups are hydrogen atoms include 2,3,4-trimethyl-1-(4-pentenyl)benzene, 2,3,4-triethyl-1-(4-pentenyl)benzene, 2,3,5-trimethyl-1-(4-pentenyl)benzene, 2,3,5-triethyl-1-(4-pentenyl)benzene, 2,3,6-trimethyl-1-(4-pentenyl)benzene, 2,3,6-triethyl-1-(4-pentenyl)benzene, 2,4,5-trimethyl-1-(4-pentenyl)benzene, 2,4,5-triethyl-1-(4-pentenyl)benzene, 2,4,6-trimethyl-1-(4-pentenyl)benzene, 2,4,6-triethyl-1-(4-pentenyl)benzene, 3,4,5-trimethyl-1-(4-pentenyl)benzene, and 3,4,5-triethyl-1-(4-pentenyl)benzene.

Of the compounds represented by Formula (1), examples of a compound in which $R^{16}$ and $R^{17}$ are hydrogen atoms, $R^{18}$ is a methyl group, k is 0, one group selected from $R^{11}$, $R^{12}$, $R^{13}$, $R^{14}$ and $R^{15}$ is an alkyl group and the remaining four groups are hydrogen atoms include 2-methyl-1-isopropenylbenzene, 2-ethyl-1-isopropenylbenzene, 2-propyl-1-isopropenylbenzene, 2-butyl-1-isopropenylbenzene, 3-methyl-1-isopropenylbenzene, 3-ethyl-1-isopropenylbenzene, 3-propyl-1-isopropenylbenzene, 3-butyl-1-isopropenylbenzene, 4-methyl-1-isopropenylbenzene, 4-ethyl-1-isopropenylbenzene, 4-propyl-1-isopropenylbenzene, and 4-butyl-1-isopropenylbenzene.

Of the compounds represented by Formula (1), examples of a compound in which $R^{16}$ and $R^{17}$ are hydrogen atoms, $R^{18}$ is a vinyl group, k is 0, one group selected from $R^{11}$, $R^{12}$, $R^{13}$, $R^{14}$ and $R^{15}$ is an alkyl group and the remaining four groups are hydrogen atoms include 2-(2-methylphenyl)-1,3-butadiene, 2-(2-ethylphenyl)-1,3-butadiene, 2-(2-propylphenyl)-1,3-butadiene, 2-(2-butylphenyl)-1,3-butadiene, 2-(3-methylphenyl)-1,3-butadiene, 2-(3-ethylphenyl)-1,3-butadiene, 2-(3-propylphenyl)-1,3-butadiene, 2-(3-butylphenyl)-1,3-butadiene, 2-(4-methylphenyl)-1,3-butadiene, 2-(4-ethylphenyl)-1,3-butadiene, 2-(4-propylphenyl)-1,3-butadiene, and 2-(4-butylphenyl)-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is a methylene group, one group selected from $R^{11}$, $R^{12}$, $R^{13}$, $R^{14}$ and $R^{15}$ is an alkyl group and the remaining four groups are hydrogen atoms include 2-(2-methylphenyl)methyl-1,3-butadiene, 2-(2-ethylphenyl)methyl-1,3-butadiene, 2-(2-propylphenyl)methyl-1,3-butadiene, 2-(2-butylphenyl)methyl-1,3-butadiene, 2-(3-methylphenyl)methyl-1,3-butadiene, 2-(3-ethylphenyl)methyl-1,3-butadiene, 2-(3-propylphenyl)methyl-1,3-butadiene, 2-(3-butylphenyl)methyl-1,3-butadiene, 2-(4-methylphenyl)methyl-1,3-butadiene, 2-(4-ethylphenyl)methyl-1,3-butadiene, 2-(4-propylphenyl)methyl-1,3-butadiene, and 2-(4-butylphenyl)methyl-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is an ethylene group, one group selected from $R^{11}$, $R^{12}$, $R^{13}$, $R^{14}$ and $R^{15}$ is an alkyl group and the remaining four groups are hydrogen atoms include 2-[2-(2-methylphenyl)ethyl]-1,3-butadiene, 2-[2-(2-ethylphenyl) ethyl]-1,3-butadiene, 2-[2-(2-propylphenyl)ethyl]-1,3-butadiene, 2-[2-(2-butylphenyl)ethyl]-1,3-butadiene, 2-[2-(3-methylphenyl)ethyl]-1,3-butadiene, 2-[2-(3-ethylphenyl) ethyl]-1,3-butadiene, 2-[2-(3-propylphenyl)ethyl]-1,3-butadiene, 2-[2-(3-butylphenyl)ethyl]-1,3-butadiene, 2-[2-(4-methylphenyl)ethyl]-1,3-butadiene, 2-[2-(4-ethylphenyl) ethyl]-1,3-butadiene, 2-[2-(4-propylphenyl)ethyl]-1,3-butadiene, and 2-[2-(4-butylphenyl)ethyl]-1,3-butadiene.

Of the compounds represented by Formula (1), examples of a compound in which $R^{16}$ and $R^{17}$ are hydrogen atoms, $R^{18}$ is a vinyl group, k is 1, $R^{19}$ is a trimethylene group, one group selected from $R^{11}$, $R^{12}$, $R^{13}$, $R^{14}$ and $R^{15}$ is an alkyl group and the remaining four groups are hydrogen atoms include 2-[3-(2-methylphenyl)propyl]-1,3-butadiene, 2-[3-(2-ethylphenyl)propyl]-1,3-butadiene, 2-[3-(2-propylphenyl)propyl]-1,3-butadiene, 2-[3-(2-butylphenyl)propyl]-1,3-butadiene, 2-[3-(3-methylphenyl)propyl]-1,3-butadiene, 2-[3-(3-ethylphenyl)propyl]-1,3-butadiene, 2-[3-(3-propylphenyl)propyl]-1,3-butadiene, 2-[3-(3-butylphenyl)propyl]-1,3-butadiene, 2-[3-(4-methylphenyl)propyl]-1,3-butadiene, 2-[3-(4-ethylphenyl)propyl]-1,3-butadiene, 2-[3-(4-propylphenyl)propyl]-1,3-butadiene, and 2-[3-(4-butylphenyl)propyl]-1,3-butadiene.

Of the compounds represented by Formula (1), examples of a compound in which $R^{16}$ and $R^{17}$ are hydrogen atoms, $R^{18}$ is a phenyl group, k is 0, one group selected from $R^{11}$, $R^{12}$, $R^{13}$, $R^{14}$ and $R^{15}$ is an alkyl group and the remaining four groups are hydrogen atoms include 1-(2-methylphenyl)-1-phenylethylene, 1-(2-ethylphenyl)-1-phenylethylene, 1-(2-propylphenyl)-1-phenylethylene, 1-(2-butylphenyl)-1-phenylethylene, 1-(3-methylphenyl)-1-phenylethylene, 1-(3-ethylphenyl)-1-phenylethylene, 1-(3-propylphenyl)-1-phenylethylene, 1-(3-butylphenyl)-1-phenylethylene, 1-(4-methylphenyl)-1-phenylethylene, 1-(4-ethylphenyl)-1-phenylethylene, 1-(4-propylphenyl)-1-phenylethylene, and 1-(4-butylphenyl)-1-phenylethylene.

Of the compounds represented by Formula (1), examples of the compound in which $R^{16}$ and $R^{17}$ are hydrogen atoms, $R^{18}$ is a 4-tolyl group, k is 0, one group selected from $R^{11}$, $R^{12}$, $R^{13}$, $R^{14}$ and $R^{15}$ is an alkyl group and the remaining four groups are hydrogen atoms include 1,1-bis(4-methylphenyl) ethylene, 1,1-bis(4-ethylphenyl)ethylene, 1,1-bis(4-propylphenyl)ethylene, and 1,1-bis(4-butylphenyl)ethylene.

Of the compounds represented by Formula (1), examples of a compound in which $R^{16}$ is a vinyl group, $R^{17}$ and $R^{18}$ are hydrogen atoms, k is 0, one group selected from $R^{11}$, $R^{12}$, $R^{13}$, $R^{14}$ and $R^{15}$ is an alkyl group and the remaining four groups are hydrogen atoms include 1-(2-methylphenyl)-1,3-butadiene, 1-(2-ethylphenyl)-1,3-butadiene, 1-(2-propylphenyl)-1,3-butadiene, 1-(2-butylphenyl)-1,3-butadiene, 1-(3-methylphenyl)-1,3-butadiene, 1-(3-ethylphenyl)-1,3-butadiene, 1-(3-propylphenyl)-1,3-butadiene, 1-(3-butylphenyl)-1,3-butadiene, 1-(4-methylphenyl)-1,3-butadiene, 1-(4-ethylphenyl)-1,3-butadiene, 1-(4-propylphenyl)-1,3-butadiene, and 1-(4-butylphenyl)-1,3-butadiene.

The compound represented by Formula (1) is preferably a compound in which $R^{11}$, $R^{12}$, $R^{13}$, $R^{14}$ or $R^{15}$ is a hydrogen atom or an alkyl group having 1 to 8 carbon atoms, at least one of $R^{11}$, $R^{12}$, $R^{13}$, $R^{14}$ and $R^{15}$ is an alkyl group having 1 to 8 carbon atoms, $R^{16}$, $R^{17}$ and $R^{18}$ are hydrogen atoms, and k is 0. More preferred is a compound in which $R^{11}$, $R^{12}$, $R^{13}$, $R^{14}$ or $R^{15}$ is a hydrogen atom or an alkyl group having 1 to 5 carbon atoms, at least one of $R^{11}$, $R^{12}$, $R^{13}$, $R^{14}$ and $R^{15}$ is an alkyl group having 1 to 5 carbon atoms which is bound to a benzene ring via a carbon atom with two or more of hydrogen atoms bound thereto, $R^{16}$, $R^{17}$ and $R^{18}$ are hydrogen atoms, and k is 0. Even more preferred is a compound in which one to three groups selected from $R^{11}$, $R^{12}$, $R^{13}$, $R^{14}$ and $R^{15}$ are each a methyl group or an ethyl group, the remaining groups are hydrogen atoms, $R^{16}$, $R^{17}$ and $R^{18}$ are hydrogen atoms, and k is 0. Particularly preferred is a compound in which one or two groups selected from $R^{11}$, $R^{12}$, $R^{13}$, $R^{14}$ and $R^{15}$ are each a methyl group or an ethyl group, the remaining groups are hydrogen atoms, $R^{16}$, $R^{17}$ and $R^{18}$ are hydrogen atoms, and k is 0.

The compound represented by Formula (1) is most preferably 3-methylstyrene, 3-ethylstyrene, 4-methylstyrene, 4-ethylstyrene, 2,4-dimethylstyrene, 2,4-diethylstyrene, 2,5-dimethylstyrene, 2,5-diethylstyrene, 3,5-dimethylstyrene, or 3,5-diethylstyrene.

Two or more compounds represented by Formula (1) may be used.

The compound represented by Formula (1) is preferably a compound in which $R^{11}$, $R^{12}$, $R^{13}$, $R^{14}$ or $R^{15}$ is a hydrogen atom or an alkyl group having 1 to 8 carbon atoms, at least one of $R^{11}$, $R^{12}$, $R^{13}$, $R^{14}$ and $R^{15}$ is an alkyl group having 1 to 8 carbon atoms, $R^{16}$, $R^{17}$ and $R^{18}$ are hydrogen atoms, and k is 0. More preferred is a compound in which $R^{11}$, $R^{12}$, $R^{13}$, $R^{14}$ or $R^{15}$ is a hydrogen atom or an alkyl group having 1 to 5 carbon atoms, at least one of $R^{11}$, $R^{12}$, $R^{13}$, $R^{14}$ and $R^{15}$ is an alkyl group having 1 to 5 carbon atoms which is bound to a benzene ring via a carbon atom with two or more of hydrogen atoms bound thereto, $R^{16}$, $R^{17}$ and $R^{18}$ are hydrogen atoms, and k is 0. Even more preferred is a compound in which one to three groups selected from $R^{11}$, $R^{12}$, $R^{13}$, $R^{14}$ and $R^{15}$ are each a methyl group or an ethyl group, the remaining groups are hydrogen atoms, R, $R^{17}$ and $R^{18}$ are hydrogen atoms, and k is 0. Particularly preferred is a compound in which one or two groups selected from $R^{11}$, $R^{12}$, $R^{13}$, $R^{14}$ and $R^{15}$ are each a methyl group or an ethyl group, the remaining groups are hydrogen atoms, $R^{16}$, $R^{17}$ and $R^{18}$ are hydrogen atoms, and k is 0.

Of the compounds represented by Formula (2), examples of a compound in which $R^{20}$, $R^{21}$, $R^{22}$, $R^{23}$, and $R^{24}$ are all hydrogen atoms include styrene, α-methylstyrene, α-ethylstyrene, and α-propylstyrene.

Of the compounds represented by Formula (2), examples of a compound in which two or more groups selected from $R^{20}$, $R^{21}$, $R^{22}$, $R^{23}$ and $R^{24}$ are linked to form a ring consisting of carbon atoms together with the carbon atoms to which the groups are attached, and each of the rest of $R^{20}$, $R^{21}$, $R^{22}$, $R^{23}$ and $R^{24}$ is a hydrogen atom include vinylnaphthalene, vinylanthracene, vinylindene, and vinylphenanthrene.

Preferred as a compound represented by Formula (2) are styrene, α-methylstyrene, and vinylnaphthalene, and more preferred is styrene. Two or more compounds represented by Formula (2) may be used.

In the conjugated diene-based polymer, the content of the monomer unit derived from the compound represented by Formula (2) is preferably 10% by weight or more, more preferably 15% by weight or more where the total amount of the monomer units contained in the conjugated diene-based polymer is taken as 100% by weight. This content is preferably 50% by weight or less, more preferably 45% by weight or less. Adjusting the content to 10% by weight or more can enhance gripping properties and tensile strength at break.

In the conjugated diene-based polymer, the content of the monomer unit derived from the conjugated diene compound is preferably 50% by weight or more, and more preferably 55% by weight or more where the total amount of the monomer units contained in the conjugated diene-based polymer is taken as 100% by weight. This content is preferably 90% by weight or less, and more preferably 85% by weight or less. Adjusting the content to 50% by weight or more can enhance fuel economy.

The conjugated diene-based polymer may have a nitrogen atom-containing group on at least one of polymer chain ends. Examples of the nitrogen atom-containing group include a substituted amino group and a nitrogen-containing heterocyclic group.

<Method for Producing Conjugated Diene-Based Polymer>

Preferably, the conjugated diene-based polymer can be obtained by polymerizing monomer components comprising a conjugated diene compound, a compound represented by Formula (1), and a compound represented by Formula (2) using an organometallic compound in a hydrocarbon solvent.

The hydrocarbon solvent is a solvent which does not inactivate organometallic compounds. Examples of the hydrocarbon solvent include aliphatic hydrocarbons such as propane, butane, isobutane, pentane, isopentane and hexane; aromatic hydrocarbons such as benzene, toluene, xylene and ethylbenzene; and alicyclic hydrocarbons such as cyclopentane and cyclohexane. One or more members of them are used.

The polymerization of the monomer components may be performed in the presence of an agent for adjusting the amount of vinyl bonds of monomer units derived from the conjugated diene compound, and an agent for adjusting the distribution of monomer units derived from the conjugated diene compound and monomer units derived from a compound other than the conjugated diene compound in a conjugated diene-based polymer chain (hereinafter, collectively referred to as an "adjusting agent"). Examples of the adjusting agent include ether compounds, tertiary amines, phosphine compounds, alkali metal alkoxides, and alkali metal phenoxides. Examples of the ether compounds include cyclic ethers, such as tetrahydrofuran, tetrahydropyran, and 1,4-dioxane; aliphatic monoethers, such as diethyl ether and dibutyl ether; aliphatic diethers, such as ethylene glycol dimethyl ether, ethylene glycol diethyl ether, and ethylene glycol dibutyl ether; aliphatic triethers, such as diethylene glycol diethyl ether and diethylene glycol dibutyl ether; and aromatic ethers, such as diphenyl ether and anisole. Examples of the tertiary amines include triethylamine, tripropylamine, tributylamine, 1,1,2,2-tetramethylethylenediamine, N,N-diethylaniline, pyridine, and quinoline. Examples of the phosphine compounds include trimethylphosphine, triethylphosphine, and triphenylphosphine. Examples of the alkali metal alkoxides include sodium tert-butoxide, potassium tert-butoxide, sodium tert-pentoxide, and potassium tert-pentoxide. Examples of the alkali metal phenoxides include sodium phenoxide and potassium phenoxide. Two or more adjusting agents may be used.

In order to enhance fuel economy, gripping properties, and tensile strength at break, the amount of use of the compound represented by Formula (1) in the polymerization of monomer components is preferably 0.01% by weight or more, more preferably 0.02% by weight or more, even more preferably 0.05% by weight or more, and further preferably 0.1% by weight or more where the total usage amount of the monomer components in the polymerization is taken as 100% by weight. It is preferably 10% by weight or less, more preferably 0.5% by weight or less, even more preferably 1% by weight or less, and further preferably 0.5% by weight or less.

Examples of the organometallic compound to be used for obtaining the conjugated diene-based polymer by polymerizing the monomer components include organoalkali metal compounds such as an organolithium compound, an organosodium compound, an organopotassium compound, an organorubidium compound, and an organocesium compound. Examples of the organolithium compound include a hydrocarbyllithium compound and a hydrocarbylenedilithium compound. Examples of the organosodium compound include sodium naphthalenide and sodium biphenylide. Examples of the organopotassium compound include potassium naphthalenide.

Examples of the hydrocarbyllithium compound include alkyllithium compounds such as methyllithium, ethyllithium, propyllithium, isopropyllithium, n-butyllithium, isobutyllithium, sec-butyllithium, tert-butyllithium, tert-octyllithium, and n-decyllithium; aryllithium compounds such as phenyllithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllithium.

Examples of the hydrocarbylenedilithium compound include 1,4-dilithio-2-butene and 1,3-bis(1-lithio-1,3-dimethylpentyl)benzene.

The amount of use of the organometallic compound to be used in the polymerization of the monomer components is preferably from 0.01 mmol to 15 mmol per 100 g of the monomer components to be used in the polymerization.

In the polymerization of the monomer components, respective monomer components may be fed in a plurality of times or all of them may be fed at once. In addition, respective monomers may be fed to a polymerization reactor at different times or alternatively may be fed at the same time.

Examples of the method of feeding the compound represented by Formula (1) in the polymerization of monomer components include the following method. That is a method in which when the amount of the compound represented by Formula (1) to be used is taken as 100% by weight, from 10% by weight to 40% by weight of the compound represented by Formula (1) is fed into a hydrocarbon solvent before the degree of progress of polymerization exceeds 15%, from 40% by weight to 70% by weight of the compound represented by Formula (1) is fed into a hydrocarbon solvent before the degree of progress of polymerization exceeds 30%, and from 70% by weight to 100% by weight of the compound represented by Formula (1) is fed into a hydrocarbon solvent before the degree of progress of polymerization exceeds 90%. A conjugated diene-based polymer composition superior in gripping properties and fully satisfactory in tensile elongation at break can be obtained by using the conjugated diene-based polymer obtained according to the method described above. In the present specification, the degree of progress of polymerization is defined to be the ratio of the weight average molecular weight of the conjugated diene-based polymer at a certain time point to the weight average molecular weight of the conjugated diene-based polymer finally obtained.

In the polymerization of the monomer components, the polymerization temperature is usually 25° C. or higher, preferably 35° C. or higher, more preferably 50° C. or higher. The polymerization temperature is usually 100° C. or lower, preferably 90° C. or lower, more preferably 80° C. or lower. The polymerization time is usually from 10 minutes to 5 hours.

The conjugated diene-based polymer may be a polymer which has been coupled with a coupling agent. The coupled polymer is usually obtained by adding a coupling agent to a polymer solution obtained by polymerizing monomer components containing a conjugated diene compound, a compound represented by Formula (1), and a compound represented by Formula (2) to react them. The addition of the coupling agent is usually performed before adding the modifying agent having a nitrogen atom-containing group to a polymerization solution. Examples of the coupling agent include a compound represented by the following Formula (4):

$$R^{31}{}_a ML_{4-a} \quad (4)$$

wherein $R^{31}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by the Formula (4) given above include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent to be added per mol of the organometallic compound used for the polymerization is preferably 0.03 mol or more, more preferably 0.05 mol or more. The added amount is preferably 0.4 mol or less, more preferably 0.3 mol or less.

In the conjugated diene-based polymer, an active end of the polymer chain may have been inactivated with an alcohol or the like. Examples of a method of the inactivation include a method of adding an alcohol to a polymerization solution obtained by polymerizing monomer components containing a conjugated diene-based compound, a compound represented by Formula (1), and a compound represented by Formula (2). As the alcohol, methanol, 1-butanol, etc. can be used.

When the conjugated diene-based polymer is recovered from the polymerization solution, the conjugated diene-based polymer can be recovered from the polymerization solution by a known method such as a method of adding a coagulating agent to the polymerization solution, or a method of adding steam to the polymerization solution. The recovered conjugated diene-based polymer may be dried with a known drier such as a band drier or an extrusion-type drier.

The conjugated diene-based polymer obtained by polymerization conducted in a hydrocarbon solvent may be subjected to a step of the reaction with an organometallic compound described below, in the state of a polymerization solution.

<Reaction Between Conjugated Diene-Based Polymer and Organometallic Compound>

The modified conjugated diene-based polymer of the present invention is obtained by reacting a conjugated diene-based polymer with an organometallic compound, and reacting the resulting product with a compound containing a nitrogen atom and a carbonyl group.

The reaction between the conjugated diene-based polymer and the organometallic compound is performed preferably in a hydrocarbon solvent. As the hydrocarbon solvent, there can be used the hydrocarbon solvents provided above as examples of the hydrocarbon solvent to be used for polymerization.

In one possible embodiment, the conjugated diene-based polymer is dissolved in the hydrocarbon solvent, the organometallic compound is then added to the resulting solution, and the conjugated diene-based polymer and the organometallic compound are reacted with each other. When the conjugated diene-based polymer obtained by the polymerization performed in the hydrocarbon solvent is used in the state of a polymerization solution, the organometallic compound may be added to the polymerization solution to react the conjugated diene-based polymer with the organometallic compound.

Examples of the organometallic compound to be reacted with the conjugated diene-based polymer include organoalkali metal compounds such as an organolithium compound, an organosodium compound, and an organopotassium compound. Examples of the organolithium compound include a hydrocarbyllithium compound. Examples of the organosodium compound include sodium naphthalenide and sodium biphenylide. Examples of the organopotassium compound include potassium naphthalenide.

Examples of the hydrocarbyllithium compound include alkyllithium compounds such as ethyllithium, propyllithium, isopropyllithium, n-butyllithium, isobutyllithium, sec-butyllithium, tert-butyllithium, tert-octyllithium, and n-decyllithium; aryllithium compounds such as phenyllithium, 2-naphthyllithium, and 2-butylphenyllithium; arylalkyllithium compounds such as 4-phenylbutyllithium; and cycloalkyllithium compounds such as cyclopentyllithium and cyclohexyllithium. The hydrocarbyllithium compound is preferably an alkyllithium compound, more preferably n-butyllithium or sec-butyllithium, even more preferably sec-butyllithium.

The organometallic compound to be reacted with the conjugated diene-based polymer may be either the same as or different from the organometallic compound used in the polymerization.

In the step of reacting the conjugated diene-based polymer with the organometallic compound, the amount of the organometallic compound added per 100 g of the conjugated diene-based polymer is preferably 20 mmol or less, more preferably 8 mmol or less, and is preferably 0.5 mmol or more.

The reaction between the conjugated diene-based polymer with the organometallic compound is performed preferably in the presence of one or more compounds (hereinafter sometimes referred to as compound (X)) selected from the compound group consisting of an ether compound, a tertiary amine, a phosphine compound, an alkali metal alkoxide, and an alkali metal phenoxide, more preferably in the presence of a tertiary amine. Examples of the ether compounds include cyclic ethers, such as tetrahydrofuran, tetrahydropyran, and 1,4-dioxane; aliphatic monoethers, such as diethyl ether and dibutyl ether; aliphatic diethers, such as ethylene glycol dimethyl ether, ethylene glycol diethyl ether, and ethylene glycol dibutyl ether; aliphatic triethers, such as diethylene glycol diethyl ether and diethylene glycol dibutyl ether; and aromatic ethers, such as diphenyl ether and anisole. The ether compound is preferably a cyclic ether or an aliphatic diether, more preferably tetrahydrofuran or ethylene glycol diethyl ether. Examples of the tertiary amine include triethylamine, tripropylamine, tributylamine, 1,1,2,2-tetramethylethylenediamine, N,N-diethylaniline, N,N,N',N",N"-pentamethyldiethylenetriamine, 1,1,4,7,10,10-hexamethyltriethylenetetramine, (−)-sparteine, pyridine, and quinoline. The tertiary amine is preferably 1,1,2,2-tetramethylethylenediamine. Examples of the phosphine compound include trimethylphosphine, triethylphosphine, and triphenylphosphine. Examples of the alkali metal alkoxides include sodium tert-butoxide, potassium tert-butoxide, sodium tert-pentoxide, and potassium tert-pentoxide. Examples of the alkali metal phenoxides include sodium phenoxide and potassium phenoxide. The amount of the compound (X) to be added per mol of the organometallic compound is preferably from 0.1 mol to 10 mol.

The compound (X) may be added to a conjugated diene-based polymer solution after it is mixed with the organometallic compound in advance, or the compound (X) and the organometallic compound may be added sequentially to the conjugated diene-based polymer solution.

The temperature at which the conjugated diene-based polymer is reacted with the organometallic compound is preferably 40° C. or higher, more preferably 50° C. or higher. The temperature is preferably 90° C. or lower, more preferably 80° C. or lower.

The time during which the conjugated diene-based polymer is reacted with the organometallic compound is preferably 10 seconds or longer, more preferably 1 minute or longer. The time is preferably 150 minutes or shorter, more preferably 50 minutes or shorter.

<Reaction with Compound Containing Nitrogen Atom and Carbonyl Group>

A compound containing a nitrogen atom and a carbonyl group is reacted with a product obtained by reacting a conjugated diene-based polymer with an organometallic compound.

The reaction of the product with the compound containing a nitrogen atom and a carbonyl group is performed preferably in a hydrocarbon solvent. As the hydrocarbon solvent, there can be used the hydrocarbon solvents provided above as examples of the hydrocarbon solvent to be used for polymerization.

In the reaction of the product with the compound containing a nitrogen atom and a carbonyl group, preferably, the compound containing a nitrogen atom and a carbonyl group is added to a solution containing the product produced from the conjugated diene-based polymer and the organometallic compound and then the product produced from the conjugated diene-based polymer and the organometallic compound is reacted with the compound containing a nitrogen atom and a carbonyl group.

Examples of a preferred compound containing a nitrogen atom and a carbonyl group include a compound represented by Formula (3);

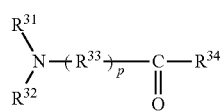

(3)

wherein $R^{31}$ and $R^{32}$ are each independently a hydrocarbyl group optionally having a substituent and $R^{34}$ represents a hydrocarbyl group optionally having a substituent, or a hydrogen atom, or $R^{31}$ and $R^{32}$ are linked to form a hydrocarbylene group optionally having a nitrogen atom and/or an oxygen atom and $R^{34}$ represents a hydrocarbyl group optionally having a substituent, or $R^{31}$ and $R^{34}$ are linked to form a hydrocarbylene group optionally having a nitrogen atom and/or an oxygen atom and $R^{32}$ represents a hydrocarbyl group optionally having a substituent; $R^{33}$ represents a divalent group and p represents 0 or 1.

In the formula (3), a hydrocarbyl group optionally having a substituent of $R^{31}$, $R^{32}$ and $R^{33}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, a n-propyl group, an isopropyl group, and a n-butyl group; alkenyl groups such as a vinyl group, an allyl group, and an isopropenyl group; and aryl groups such as a phenyl group. Examples of the substituted hydrocarbyl group in which the substituent is a hydrocarbyloxy group include hydrocarbyloxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkyl aryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and 4-imidazolyl ethylphenyl group.

In Formula (3), the hydrocarbylene group that is formed by binding $R^{31}$ to $R^{32}$ and optionally has a nitrogen atom and/or an oxygen atom, and the hydrocarbylene group that is formed by binding $R^{31}$ to $R^{34}$ and optionally has a nitrogen atom and/or an oxygen atom are each a hydrocarbylene group or a hydrocarbylene group containing a nitrogen atom and/or an oxygen atom. Examples of the hydrocarbylene group containing a nitrogen atom and/or an oxygen atom include a hydrocarbylene group containing a nitrogen atom, a hydrocarbylene group containing an oxygen atom, and a hydrocarbylene group containing a nitrogen atom and an oxygen atom. Examples of the hydrocarbylene group include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pentan-2-ene-1,5-diyl group. Examples of the arylene group include a 1,4-phenylene group. Examples of the hydrocarbylene group containing a nitrogen atom include a group represented by —CH=N—CH=CH— and a group represented by —CH=N—$CH_2$—$CH_2$—. Examples of the hydrocarbylene group containing an oxygen atom include a group represented by —$(CH_2)_s$—O—$(CH_2)_t$— (s and t each represent an integer of 1 or more).

In Formula (3), examples of the divalent group as $R^{33}$ include a hydrocarbylene group, a hydrocarbylene group containing a nitrogen atom, a hydrocarbylene group containing an oxygen atom, a group in which a hydrocarbylene group is combined with an oxygen atom, and a group in which a hydrocarbylene group is combined with a group represented by —$NR^{35}$— wherein $R^{35}$ represents a hydrocarbyl group or a hydrogen atom. Examples of the hydrocarbylene group include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pentan-2-ene-1,5-diyl group. Examples of the arylene group include a 1,4-phenylene group. Examples of the hydrocarbylene group containing a nitrogen atom include a group represented by —CH=N—CH=CH— and a group represented by —CH=N—CH$_2$—CH$_2$—. Examples of the hydrocarbylene group containing an oxygen atom include a group represented by —(CH$_2$)$_s$—O—(CH$_2$)$_t$— (s and t each represent an integer of 1 or more). Examples of the group in which a hydrocarbylene group and an oxygen atom are bound include a group represented by —(CH$_2$)$_r$—O— (r represents an integer of 1 or more). Examples of the group in which a hydrocarbylene group is combined with a group represented by —NR$^{35}$— (R$^{35}$ represents a hydrocarbyl group or a hydrogen atom) include a group represented by —(CH$_2$)$_q$—NR$^{35}$— wherein R$^{35}$ represents a hydrocarbyl group having 1 to 6 carbon atoms or a hydrogen atom, and q is an integer of 1 or more.

Examples of a preferred compound represented by Formula (3) include a compound represented by Formula (3-A), which is a compound represented by Formula (3) in which p is 0, and R$^{34}$ is a hydrocarbyl group optionally having a substituent, or a hydrogen atom:

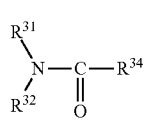

(3-A)

wherein R$^{31}$ and R$^{32}$ are each independently a hydrocarbyl group optionally having a substituent and R$^{34}$ represents a hydrocarbyl group optionally having a substituent, or a hydrogen atom, or R$^{31}$ and R$^{32}$ may be linked to form a hydrocarbylene group optionally having a nitrogen atom and/or an oxygen atom and R$^{34}$ represents a hydrocarbyl group optionally having a substituent.

In Formula (3-A), explanation and exemplification of a hydrocarbyl group optionally having a substituent of R$^{31}$, R$^{32}$ and R$^{34}$, and a hydrocarbylene group optionally having a nitrogen atom and/or an oxygen atom formed by binding R$^{31}$ to R$^{32}$ are the same as those stated in the explanation of Formula (3).

In Formula (3-A), R$^{32}$ is preferably a hydrocarbyl group having 1 to 10 carbon atoms, or is a group that is bound to R$^{32}$ to form a hydrocarbylene group having 3 to 10 carbon atoms or that is bound to R$^{32}$ to form a nitrogen atom-containing hydrocarbylene group having 3 to 10 carbon atoms. More preferably, it is an alkyl group having 1 to 10 carbon atoms or an aryl group having 6 to 10 carbon atoms, or is a group that is bound to R$^{32}$ to form a polymethylene group having 3 to 10 carbon atoms, that is bound to R$^{32}$ to form a group represented by —CH=N—CH=CH— or that is bound to R$^{32}$ to form a group represented by —CH=N—CH$_2$—CH$_2$—. Further preferably, it is an alkyl group having 1 to 6 carbon atoms. Particularly preferably, it is a methyl group or an ethyl group.

In Formula (3-A), R$^{32}$ is preferably a hydrocarbyl group having 1 to 10 carbon atoms, or is a group that is bound to R$^{31}$ to form a hydrocarbylene group having 3 to 10 carbon atoms or that is bound to R$^{31}$ to form a nitrogen atom-containing hydrocarbylene group having 3 to 10 carbon atoms. More preferably, it is an alkyl group having 1 to 10 carbon atoms or an aryl group having 6 to 10 carbon atoms, or a group that is bound to R$^{31}$ to form a polymethylene group having 3 to 10 carbon atoms, that is bound to R$^{31}$ to form a group represented by —CH=N—CH=CH—, or that is bound to R$^{31}$ to form a group represented by —CH=N—CH$_2$—CH$_2$—. Further preferably, it is an alkyl group having 1 to 6 carbon atoms. Particularly preferably, it is a methyl group or an ethyl group.

In Formula (3-A), R$^{34}$ is preferably a hydrocarbyl group or a hydrogen atom, more preferably a hydrocarbyl group having 1 to 10 carbon atoms or a hydrogen atom, even more preferably an alkyl group having 1 to 6 carbon atoms, an alkenyl group having 2 to 6 carbon atoms or a hydrogen atom, and particularly preferably a hydrogen atom, a methyl group, an ethyl group or a vinyl group.

Of the compounds represented by Formula (3-A), examples of the compound in which R$^{34}$ is a hydrocarbyl group include N,N-dihydrocarbylacetamide such as N,N-dimethylacetamide, N,N-diethylacetamide and N-methyl-N-ethylacetamide; N,N-dihydrocarbylacrylamide such as N,N-dimethylacrylamide, N,N-diethylacrylamide and N-methyl-N-ethylacrylamide; and N,N-dihydrocarbylmethacrylamide such as N,N-dimethylmethacrylamide, N,N-diethylmethacrylamide and N-methyl-N-ethylmethacrylamide.

Of the compounds represented by Formula (3-A), examples of a compound in which R$^{34}$ is a hydrogen atom include N,N-dihydrocarbylformamides such as N,N-dimethylformamide, N,N-dimethylformamide, and N-methyl-N-ethylformamide.

Examples of a preferred compound represented by Formula (3) include a compound represented by Formula (3-B), which is a compound represented by Formula (3) in which p is 0, and R$^{33}$ and R$^{31}$ are bound to form a divalent group:

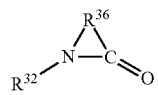

(3-B)

wherein R$^{32}$ represents a hydrocarbyl group optionally having a substituent, R$^{36}$ represents a hydrocarbylene group, or a group in which a hydrocarbylene group bonds to a group represented by —NR$^{35}$—, and R$^{35}$ represents a hydrocarbyl group or a hydrogen atom.

In Formula (3-B), explanation and exemplification of a hydrocarbyl group optionally having a substituent of R$^{32}$ are the same as those stated in explanation of Formula (3).

In Formula (3-B), examples of the hydrocarbylene group of R$^{36}$ include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,6-trimethylhexane-1,6-diyl group. Examples of the alkenediyl group include a pentan-2-ene-1, 5-diyl group. Examples of the arylene group include a 1,4-phenylene group. Examples of the group in which a hydrocarbylene group is combined with a group represented by —NR$^{35}$— wherein R$^{35}$ represents a hydrocarbyl group or a hydrogen atom as R$^{36}$ include a group represented by —(CH$_2$)$_q$—NR$^{35}$— wherein R$^{35}$ represents a hydrocarbyl group or a hydrogen atom, and q is an integer of 1 or more.

In Formula (3-B), R$^{32}$ is preferably a hydrocarbyl group having 1 to 10 carbon atoms, more preferably an alkyl group having 1 to 10 carbon atoms or an aryl group having 6 to 10 carbon atoms, even more preferably an alkyl group having 1 to 6 carbon atoms or a phenyl group, particularly preferably a methyl group, an ethyl group, or a phenyl group.

In Formula (3-B), R$^{36}$ is preferably a hydrocarbylene group having 1 to 10 carbon atoms, or a group in which a hydrocarbylene group having 1 to 10 carbon atoms is bound to a group represented by —NR$^{35}$— wherein R$^{35}$ represents a hydrocarbyl group having 1 to 10 carbon atoms or a hydrogen atom, more preferably a polymethylene group having 3 to 6 carbon atoms or a group represented by —$(CH_2)_q$—$NR^{35}$— wherein $R^{35}$ represents a hydrocarbyl group having 1 to 10 carbon atoms, and q represents an integer of 2 to 5, and even more preferably a trimethylene group, a tetramethylene group, a pentamethylene group, or a group represented by —$(CH_2)_2$—$N(CH_3)$—.

Of the compounds represented by Formula (3-B), examples of the compound in which $R^{36}$ is a hydrocarbylene group include N-hydrocarbyl-β-propiolactam such as N-methyl-β-propiolactam or N-phenyl-β-propiolactam; N-hydrocarbyl-2-pyrrolidone such as N-methyl-2-pyrrolidone, N-vinyl-2-pyrrolidone, N-phenyl-2-pyrrolidone, N-tert-butyl-2-pyrrolidone or N-methyl-5-methyl-2-pyrrolidone; N-hydrocarbyl-2-piperidone such as N-methyl-2-piperidone, N-vinyl-2-piperidone or N-phenyl-2-piperidone; N-hydrocarbyl-ε-caprolactam such as N-methyl-ε-caprolactam or N-phenyl-ε-caprolactam; and N-hydrocarbyl-ω-laurilolactam such as N-methyl-ω-laurilolactam or N-vinyl-ω-laurilolactam; of these, N-phenyl-2-pyrrolidone and N-methyl-ε-caprolactam are preferred.

Of the compounds represented by Formula (3-B), examples of a compound in which $R^{36}$ is a group formed by binding a hydrocarbylene group to a group represented by —$NR^{35}$— wherein $R^{35}$ represents a hydrocarbyl group or a hydrogen atom include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone; of these, 1,3-dimethyl-2-imidazolidinone is preferred.

Examples of a preferred compound represented by Formula (3) include a compound represented by Formula (3-C), which is a compound represented by Formula (3) in which p is 1, and $R^{33}$ is a hydrocarbylene group:

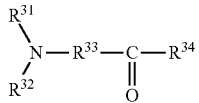

(3-C)

wherein $R^{31}$ represents a hydrocarbyl group optionally having a substituent and $R^{32}$ represents a hydrocarbyl group optionally having a substituent, or $R^{31}$ and $R^{32}$ are linked to form a hydrocarbylene group optionally having a nitrogen atom and/or an oxygen atom; $R^{33}$ represents a hydrocarbylene group; $R^{34}$ represents a hydrocarbyl group optionally having a substituent.

In Formula (3-C), explanation and exemplification of a hydrocarbyl group optionally having a substituent as $R^{31}$, $R^{32}$ and $R^{34}$, a hydrocarbylene group optionally having a nitrogen atom and/or an oxygen atom formed by binding $R^{31}$ to $R^{32}$, and a hydrocarbylene group as $R^{33}$ are the same as those stated in explanation of Formula (3).

In Formula (3-C), $R^{33}$ is preferably a hydrocarbylene group having 1 to 10 carbon atoms, more preferably an alkanediyl group having 1 to 10 carbon atoms or an arylene group having 6 to 10 carbon atoms, even more preferably a methylene group, a polymethylene group having 2 to 6 carbon atoms, or a phenylene group, particularly preferably an ethylene group, a trimethylene group, or a 1,4-phenylene group.

In Formula (3-C), $R^{34}$ is preferably a hydrocarbyl group having 1 to 10 carbon atoms, or a substituted hydrocarbyl group having 1 to 10 carbon atoms in which the substituent is a dialkylamino group, more preferably an alkyl group having 1 to 6 carbon atoms, an aryl group having 6 to 10 carbon atoms, a dialkylaminoalkyl group having 3 to 6 carbon atoms, or a dialkylaminoaryl group having 8 to 14 carbon atoms, even more preferably a methyl group, an ethyl group, a phenyl group, a 3-dimethylaminoethyl group, or a 4-diethylaminophenyl group.

In Formula (3-C), $R^{31}$ is preferably a hydrocarbyl group having 1 to 10 carbon atoms, or a group that is bound with $R^{32}$ to form a hydrocarbylene group having 3 to 10 carbon atoms, or a group that forms a nitrogen atom-containing hydrocarbylene group having 3 to 10 carbon atoms, more preferably an alkyl group having 1 to 10 carbon atoms or an aryl group having 6 to 10 carbon atoms, or a group that is bound to $R^{32}$ to form an alkanediyl group having 3 to 10 carbon atoms, a group that is bound to $R^{32}$ to form a group represented by —CH=N—CH=CH—, a group that is bound to $R^{32}$ to form a group represented by —CH=N—$CH_2$—$CH_2$—, or a group that is bound to $R^{32}$ to form a group represented by —$(CH_2)_2$—O—$(CH_2)_2$—, even more preferably an alkyl group having 1 to 6 carbon atoms, or a group that is bound to $R^{32}$ to form a polymethylene group having 3 to 6 carbon atoms, a group that is bound to $R^{32}$ to form a group represented by —CH=N—CH=CH—, or a group that is bound to $R^{32}$ to form a group represented by —CH=N—$CH_2$—$CH_2$—, particularly preferably a methyl group or an ethyl group, a group that is bound to $R^{32}$ to form a tetramethylene group, a group that is bound to $R^{32}$ to form a hexamethylene group, or a group that is bound to $R^{32}$ to form a group represented by —CH=N—CH=CH—.

In Formula (3-C), $R^{32}$ is preferably a hydrocarbyl group having 1 to 10 carbon atoms, or a group that is bound to $R^{31}$ to form a hydrocarbylene group having 3 to 10 carbon atoms, or a group that is bound to $R^{31}$ to form a nitrogen atom-containing hydrocarbylene group having 3 to 10 carbon atoms, more preferably an alkyl group having 1 to 10 carbon atoms or an aryl group having 6 to 10 carbon atoms, or a group that is bound to $R^{31}$ to form an alkanediyl group having 3 to 10 carbon atoms, a group that is bound to $R^{31}$ to form a group represented by —CH=N—CH=CH—, a group that is bound to $R^{31}$ to form a group represented by —CH=N—$CH_2$—$CH_2$—, or a group that is bound to $R^{31}$ to form a group represented by —$(CH_2)_2$—O—$(CH_2)_2$—, even more preferably an alkyl group having 1 to 6 carbon atoms, or a group that is bound to $R^{31}$ to form a polymethylene group having 3 to 6 carbon atoms, a group that is bound to $R^{31}$ to form a group represented by —CH=N—CH=CH—, or a group that is bound to $R^{31}$ to form —CH=N—$CH_2$—$CH_2$—, particularly preferably a methyl group or an ethyl group, or a group that is bound to $R^{31}$ to form a tetramethylene group, a group that is bound to $R^{31}$ to form a hexamethylene group, or a group that is bound to $R^{31}$ to form a group represented by —CH=N—CH=CH—.

Of the compounds represented by Formula (3-C), examples of a compound in which $R^{34}$ is a hydrocarbyl group include 4-(N,N-dihydrocarbylamino)acetophenones such as 4-(N,N-dimethylamino)acetophenone, 4-(N-methyl-N-ethylamino)acetophenone, and 4-(N,N-diethylamino)acetophenone; and 4-cyclic aminoacetophenone compounds such as 4'-(imidazol-1-yl)acetophenone and 4-pyrazolylacetophenone; of these, a 4-(cyclic amino)acetophenone compound is preferred, and 4'-(imidazol-1-yl)acetophenone is more preferred.

Of the compounds represented by Formula (3-C), examples of a compound in which $R^{34}$ is a substituted hydrocarbyl group include bis(dihydrocarbylaminoalkyl)ketone such as 1,7-bis(methylethylamino)-4-heptanone or 1,3-bis(diphenylamino)-2-propanone; 4-(dihydrocarbylamino)benzophenone such as 4-N,N-dimethylaminobenzophenone, 4-N,N-di-t-butylaminobenzophenone or 4-N,N-diphenylaminobenzophenone; 4,4'-bis(dihydrocarbylamino)benzophenone such as 4,4'-bis(dimethylamino)benzophenone, 4,4'-bis(diethylamino)benzophenone or 4,4'-bis(diphenylamino)benzophenone; of these, 4,4'-bis(dihydrocarbylamino)benzophenone is preferred, and 4,4'-bis(diethylamino)benzophenone is more preferred.

Examples of a preferred compound represented by Formula (3) include a compound represented by Formula (3-D), which is a compound represented by Formula (3) in which p is 1, and $R^{33}$ is a group in which a hydrocarbylene group bonds to an oxygen atom, or a group in which a hydrocarbylene group bonds to a group represented by $—NR^{35}—$ wherein $R^{35}$ represents a hydrocarbyl group or a hydrogen atom:

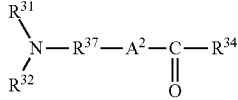

(3-D)

wherein $R^{31}$ represents a hydrocarbyl group optionally having a substituent and $R^{32}$ represents a hydrocarbyl group optionally having a substituent, or $R^{31}$ and $R^{32}$ are linked to form a hydrocarbylene group optionally having a nitrogen atom and/or an oxygen atom; $R^{37}$ represents a hydrocarbylene group; $A^2$ represents an oxygen atom or $—NR^{35}—$, $R^{35}$ represents a hydrocarbylene group or a hydrogen atom; and $R^{34}$ represents a hydrocarbyl group optionally having a substituent.

In Formula (3-D), explanation and exemplification of a hydrocarbyl group optionally having a substituent as $R^{31}$, $R^{32}$ and $R^{34}$, and a hydrocarbylene group optionally having a nitrogen atom and/or an oxygen atom formed by binding $R^{31}$ to $R^{32}$ are the same as those stated in explanation of Formula (3).

In Formula (3-D), $A^2$ is preferably an oxygen atom or a group represented by $—NR^{35}—$ wherein $R^{35}$ is a hydrocarbylene group having 1 to 5 carbon atoms or a hydrogen atom, more preferably an oxygen atom or a group represented by $—NH—$, even more preferably a group represented by $—NH—$.

In Formula (3-D), examples of the hydrocarbylene group as $R^{37}$ include an alkanediyl group, an alkenediyl group, and an arylene group. Examples of the alkanediyl group include polymethylene groups such as a trimethylene group, a tetramethylene group, a pentamethylene group, and a hexamethylene group; and a 2,2,4-trimethylhexane-1,6-diyl group. Examples of the alkenediyl group include a pentan-2-ene-1,5-diyl group. Examples of the arylene group include a 1,4-phenylene group.

In Formula (3-D), $R^{34}$ is preferably a hydrocarbyl group having 1 to 10 carbon atoms, more preferably an alkenyl group having 2 to 5 carbon atoms, even more preferably a vinyl group or an isopropenyl group, particularly preferably a vinyl group.

In Formula (3-D), $R^{37}$ is preferably a hydrocarbylene group having 1 to 10 carbon atoms, more preferably a polymethylene group having 1 to 6 carbon atoms, still more preferably an ethylene group or a trimethylene group, and particularly preferably a trimethylene group.

In Formula (3-D), $R^{31}$ is preferably a hydrocarbyl group having 1 to 10 carbon atoms, or a group that is bound to $R^{32}$ to form a hydrocarbylene group having 3 to 10 carbon atoms, or a group that is bound to $R^{32}$ to form a nitrogen atom-containing hydrocarbylene group having 3 to 10 carbon atoms, more preferably an alkyl group having 1 to 10 carbon atoms or an aryl group having 6 to 10 carbon atoms, or a group that is bound to $R^{32}$ to form an alkanediyl group having 3 to 10 carbon atoms, a group that is bound to $R^{32}$ to form a group represented by $—CH=N—CH=CH—$, a group that is bound to $R^{32}$ to form a group represented by $—CH=N—CH_2—CH_2—$, or a group that is bound to $R^{32}$ to form a group represented by $—(CH_2)_2—O—(CH_2)_2—$, even more preferably an alkyl group having 1 to 6 carbon atoms, or a group that is bound to $R^{32}$ to form a polymethylene group having 3 to 6 carbon atoms, a group that is bound to $R^{32}$ to form a group represented by $—CH=N—CH=CH—$, or a group that is bound to $R^{32}$ to form a group represented by $—CH=N—CH_2—CH_2—$, particularly preferably a methyl group or an ethyl group, or a group that is bound to $R^{32}$ to form a tetramethylene group, a group that is bound to $R^{32}$ to form a hexamethylene group, or a group that is bound to $R^{32}$ to form a group represented by $—CH=N—CH=CH—$.

In Formula (3-D), $R^{32}$ is preferably a hydrocarbyl group having 1 to 10 carbon atoms, or a group that is bound to $R^{31}$ to form a hydrocarbylene group having 3 to 10 carbon atoms, or a group that is bound to $R^{31}$ to form a nitrogen-containing hydrocarbylene group having 3 to 10 carbon atoms, more preferably an alkyl group having 1 to 10 carbon atoms or an aryl group having 6 to 10 carbon atoms, or a group that is bound to $R^{31}$ to form an alkanediyl group having 3 to 10 carbon atoms, a group that is bound to $R^{31}$ to form a group represented by $—CH=N—CH=CH—$, a group that is bound to $R^{31}$ to form a group represented by $—CH=N—CH_2—CH_2—$, or a group that is bound to $R^{31}$ to form a group represented by $—(CH_2)_2—O—(CH_2)_2—$, even more preferably an alkyl group having 1 to 6 carbon atoms, or a group that is bound to $R^{31}$ to form a polymethylene group having 3 to 6 carbon atoms, a group that is bound to $R^{31}$ to form a group represented by $—CH=N—CH=CH—$, or a group that is bound to $R^{31}$ to form $—CH=N—CH_2—CH_2—$, particularly preferably a methyl group or an ethyl group, or a group that is bound to $R^{31}$ to form a tetramethylene group, a group that is bound to $R^{31}$ to form a hexamethylene group, or a group that is bound to $R^{31}$ to form a group represented by $—CH=N—CH=CH—$.

Of the compounds represented by Formula (3-D), examples of the compound in which $A^2$ is an oxygen atom include 2-N,N-dihydrocarbylaminoethyl acrylate such as 2-N,N-dimethylaminoethyl acrylate or 2-N,N-diethylaminoethyl acrylate; 3-N,N-dihydrocarbylaminopropyl acrylate such as 3-N,N-dimethylaminopropyl acrylate; 2-N,N-dihydrocarbylaminoethyl methacrylate such as 2-N,N-dimethylaminoethyl methacrylate or 2-N,N-diethylaminoethyl methacrylate; and 3-N,N-dihydrocarbylaminopropyl methacrylate such as 3-N,N-dimethylaminopropyl methacrylate; of these, 3-N,N-dihydrocarbylaminopropyl acrylate is preferred and 3-N,N-dimethylaminopropyl acrylate is more preferred.

Of the compounds represented by Formula (3-D), examples of a compound in which $A^2$ is a group represented by $—NR^{35}—$ wherein $R^{35}$ is a hydrocarbylene group or a hydrogen atom include N,N-dihydrocarbylaminoethylacrylamides such as N,N-dimethylaminoethylacrylamide and N,N-diethylaminoethylacrylamide; N,N-dihydrocarbylaminopropylacrylamides such as N,N-dimethylaminopropylacrylamide and N,N-diethylaminopropylacrylamide; N,N-dihydrocarbylaminobutylacrylamides such as N,N-dimethylaminobutylacrylamide and N,N-diethylaminobutylacrylamide; N,N- dihydrocarbylaminoethylmethacrylamides such as N,N-dimethylaminoethylmethacrylamide and N,N-diethylaminoethylmethacrylamide; N,N-dihydrocarbylaminopropylmethacrylamides such as N,N-dimethylaminopropylmethacrylamide and N,N-diethylaminopropylmethacrylamide; N,N-dihydrocarbylaminobutylmethacrylamides such as N,N-dimethylaminobutylmethacrylamide and N,N-diethylaminobutylmethacrylamide; N,N-dihydrocarbylaminopropylacrylamides are preferred, and N,N-dimethylaminopropylacrylamide is more preferred.

Preferred as a compound represented by Formula (3) is a compound represented by Formula (3-B), and more preferred is a compound wherein in Formula (3-B), $R^{36}$ is a hydrocarbylene group or a group in which a hydrocarbylene group bonds to a group represented by —$NR^{35}$— wherein $R^{35}$ represents a hydrocarbyl group or a hydrogen atom.

When reacting a conjugated diene-based polymer with an organometallic compound and then reacting the resulting product with a compound containing a nitrogen atom and a carbonyl group, a hydrocarbyloxysilane compound may be used together.

Preferred examples of the hydrocarbyloxysilane compound to be used together include a hydrocarbyloxysilane compound having a nitrogen atom-containing group. Examples of the nitrogen atom-containing group include an amino group, a substituted amino group, a nitrogen-containing heterocyclic group, a cyano group, and an isocyanato group. Examples of the substituted amino group include a group represented by Formula (4-A) described later. Examples of the nitrogen-containing heterocyclic group include a 4-pyridyl group and a 2-imidazolyl group.

Preferred examples of the hydrocarbyloxysilane compound having a nitrogen atom-containing group include a compound represented by Formula (4):

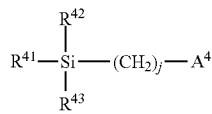

(4)

wherein $R^{41}$, $R^{42}$ and $R^{43}$ each independently represent a hydrocarbyl group or a hydrocarbyloxy group, at least one group selected from $R^{41}$, $R^{42}$ and $R^{43}$ is a hydrocarbyloxy group, $A^4$ represents a nitrogen atom-containing group, and j represents an integer of 1 to 5.

In Formula (4), $R^{41}$, $R^{42}$ and $R^{43}$ each independently represent a hydrocarbyl group or a hydrocarbyloxy group, and at least one group selected from $R^{41}$, $R^{42}$ and $R^{43}$ is a hydrocarbyloxy group. Preferably, at least two of $R^{41}$, $R^{42}$ and $R^{43}$ are hydrocarbyloxy groups, and more preferably, $R^{41}$, $R^{42}$ and $R^{43}$ are hydrocarbyloxy groups.

The number of the carbon atoms of a hydrocarbyl group and a hydrocarbyloxy group as $R^{41}$, $R^{42}$ and $R^{43}$ is preferably 1 to 8, more preferably 1 to 6, even more preferably 1 to 4.

Examples of the hydrocarbyl group as $R^{41}$, $R^{42}$ and $R^{43}$ include alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; alkenyl groups such as a vinyl group, a 2-propenyl group, and an isopropenyl group; and aryl groups such as a phenyl group and a tolyl group, preferably an alkyl group, more preferably a linear alkyl group. Particularly preferred is a methyl group or an ethyl group.

Examples of the hydrocarbyloxy group as $R^{41}$, $R^{42}$ and $R^{43}$ include alkoxy groups such as a methoxy group, an ethoxy group, a n-propoxy group, and a n-butoxy group; and aryloxy groups such as a phenoxy group, preferably an alkoxy group. Particularly preferred is a methoxy group or an ethoxy group.

Preferably, $R^{41}$, $R^{42}$ and $R^{43}$ are hydrocarbyloxy groups having 1 to 8 carbon atoms or hydrocarbyl groups having 1 to 8 carbon atoms, and at least one group selected from $R^{41}$, $R^{42}$ and $R^{43}$ is a hydrocarbyloxy group having 1 to 8 carbon atoms. More preferably, $R^{41}$, $R^{42}$ and $R^{43}$ are alkoxy groups having 1 to 6 carbon atoms or an alkyl group having 1 to 6 carbon atoms, and two or more groups selected from $R^{41}$, $R^{42}$ and $R^{43}$ are alkoxy groups having 1 to 6 carbon atoms. Even more preferably, $R^{41}$, $R^{42}$ and $R^{43}$ are alkoxy groups having 1 to 4 carbon atoms. Particularly preferably, $R^{41}$, $R^{42}$ and $R^{43}$ are methoxy groups or ethoxy groups.

In Formula (4), j represents an integer of 1 to 5, preferably 2 or 3.

In Formula (4), $A^4$ represents a nitrogen atom-containing group. Examples of the nitrogen atom-containing group include an amino group, a substituted amino group, a nitrogen-containing heterocyclic group, a cyano group, and an isocyanato group.

The substituted amino group of $A^4$ is preferably a group represented by Formula (4-A);

(4-A)

wherein $R^{44}$ represents a hydrocarbyl group optionally having a substituent or a trihydrocarbylsilyl group and $R^{45}$ represents a hydrocarbyl group optionally having a substituent or a trihydrocarbylsilyl group, or $R^{44}$ and $R^{45}$ are linked to form a hydrocarbylene group optionally having a nitrogen atom and/or an oxygen atom.

Examples of the hydrocarbyl group optionally having a substituent as $R^{44}$ and $R^{45}$ include a hydrocarbyl group, a nitrogen atom-containing substituted hydrocarbyl group, and an oxygen atom-containing substituted hydrocarbyl group.

Examples of the hydrocarbyl group include alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; alkenyl groups such as a vinyl group, a 2-propenyl group, and an isopropenyl group; and aryl groups such as a phenyl group and a tolyl group.

Examples of the nitrogen atom-containing substituted hydrocarbyl group include dialkylaminoalkyl groups such as a bis(dimethylaminomethyl)amino group, a bis(diethylaminomethyl)amino group, a bis(dimethylaminoethyl)amino group, and a bis(diethylaminoethyl)amino group.

Examples of the oxygen atom-containing substituted hydrocarbyl group include hydrocarbyloxyalkyl groups such as a methoxymethyl group, an ethoxymethyl group, a methoxyethyl group, and an ethoxyethyl group; monooxacycloalkyl groups such as a 2-tetrahydrofuranyl group; dioxacycloalkyl groups such as a 2-dioxolanyl group; and alkyl groups substituted with a monooxacycloalkyl group such as a tetrahydrofurfuryl group.

In the present specification, the monooxacycloalkyl group represents a group in which one $CH_2$ of a cycloalkyl group has been substituted with an oxygen atom. The dioxacycloalkyl group represents a group in which two $CH_2$ groups of a cycloalkyl group have been substituted with oxygen atoms.

The hydrocarbyl group optionally having a substituent as $R^{44}$ and $R^{45}$ is preferably a hydrocarbyl group, more preferably an alkyl group, even more preferably a linear alkyl group.

The number of the carbon atoms of the hydrocarbyl group optionally having a substituent as $R^{44}$ and $R^{45}$ is preferably 1 to 8, more preferably 1 to 5, even more preferably 1 to 3.

Examples of the trihydrocarbylsilyl group as $R^{44}$ and $R^{45}$ include trialkylsilyl groups such as a trimethylsilyl group, a triethylsilyl group, and a dimethyl-tert-butylsilyl group.

When $R^{44}$ and $R^{45}$ are trihydrocarbylsilyl groups, $R^{44}$ and $R^{45}$ are preferably trihydrocarbylsilyl groups having 3 to 7 carbon atoms, more preferably trialkylsilyl groups having 3 to 7 carbon atoms, in which the number of carbon atoms of each alkyl group bound to a silicon atom is 1 to 4, even more preferably trimethylsilyl groups.

Examples of the hydrocarbylene group optionally having a nitrogen atom and/or an oxygen atom formed by binding $R^{44}$ to $R^{45}$ include a hydrocarbylene group, a hydrocarbylene group containing a nitrogen atom, a hydrocarbylene group containing an oxygen atom, and a hydrocarbylene group containing a nitrogen atom and an oxygen atom. Examples of the hydrocarbylene group include an alkanediyl group and an alkenediyl group. Examples of the alkanediyl group include polymethylene groups such as an ethylene group, a trimethylene group, a tetramethylene group, a pentamethylene group, and a hexamethylene group; and a 2,2,4-trimethylhexane-1,6-diyl group. Examples of the alkenediyl group include a pentan-2-ene-1,5-diyl group. Examples of the hydrocarbylene group containing a nitrogen atom include a group represented by —CH=N—CH=CH— or a group represented by —CH=N—$CH_2$—$CH_2$—. Examples of the hydrocarbylene group containing an oxygen atom include a group represented by —$CH_2$—$CH_2$—O—$CH_2$—$CH_2$—.

The hydrocarbylene group optionally having a nitrogen atom and/or an oxygen atom is preferably a hydrocarbylene group, more preferably an alkanediyl group, even more preferably a polymethylene group.

The number of carbon atoms of the hydrocarbylene group optionally having a nitrogen atom and/or an oxygen atom is preferably 2 to 10, more preferably 3 to 8, even more preferably 4 to 6.

$R^{44}$ and $R^{45}$ each are preferably a hydrocarbyl group having 1 to 8 carbon atoms, or a trialkylsilyl group having 3 to 7 carbon atoms, or $R^{44}$ and $R^{45}$ are linked to form a hydrocarbylene group having 2 to 10 carbon atoms, more preferably an alkyl group having 1 to 5 carbon atoms, or a trialkylsilyl group having 3 to 7 carbon atoms in which the number of carbon atoms of each alkyl group bound to a silicon atom is 1 to 4, or $R^{44}$ and $R^{45}$ are linked to form an alkanediyl group having 3 to 8 carbon atoms, even more preferably a linear alkyl group having 1 to 3 carbon atoms, or a trimethylsilyl group, or $R^{44}$ and $R^{45}$ are linked to form a polymethylene group having 4 to 6 carbon atoms.

$R^{44}$ represents a hydrocarbyl group optionally having a substituent or a trihydrocarbylsilyl group or represents a group that is bound to $R^{45}$ to form a hydrocarbylene group optionally having a nitrogen atom and/or an oxygen atom. In addition, $R^{45}$ represents a hydrocarbyl group optionally having a substituent or a trihydrocarbylsilyl group or represents a group that is bound to $R^{44}$ to form a hydrocarbylene group optionally having a nitrogen atom and/or an oxygen atom.

Of the substituted amino groups represented by Formula (4-A), examples of a group in which $R^{44}$ and $R^{45}$ are hydrocarbyl groups include a dimethylamino group, a diethylamino group, a di-n-propylamino group, a diisopropylamino group, a di-n-butylamino group, and an ethylmethylamino group.

Of the substituted amino groups represented by Formula (4-A), examples of a group in which $R^{44}$ and $R^{45}$ are substituted hydrocarbyl groups containing an oxygen atom include a bis(methoxymethyl)amino group, a bis(ethoxymethyl)amino group, a bis(methoxyethyl)amino group, a bis(ethoxyethyl)amino group, a bis(3-tetrahydrofuranyl)amino group, and a bis(tetrahydrofurfuryl)amino group.

Of the substituted amino groups represented by Formula (4-A), examples of a group in which $R^{44}$ and $R^{45}$ are trihydrocarbylsilyl groups include a bis(trimethylsilyl)amino group, a bis(triethylsilyl)amino group, and a bis(tert-butyldimethylsilyl)amino group.

Of the substituted amino groups represented by Formula (4-A), examples of a group in which one of $R^{44}$ and $R^{45}$ is a hydrocarbyl group and the other is a trihydrocarbylsilyl group include a trimethylsilylmethylamino group and a trimethylsilylethylamino group.

Of the substituted amino groups represented by Formula (4-A), examples of a group in which $R^{44}$ and $R^{45}$ are linked to form a hydrocarbylene group include a pyrrolidino group, a piperidino group, a hexamethyleneimino group, and a 1,2,3,6-tetrahydropyridyl group.

Of the substituted amino groups represented by Formula (4-A), examples of a group in which $R^{44}$ and $R^{45}$ are linked to form a nitrogen atom-containing hydrocarbylene group include a 1-imidazolyl group, a 4,5-dihydro-1-imidazolyl group, a 1-pyrazyl group, and a 1-piperazinyl group.

Of the substituted amino groups represented by Formula (4-A), examples of a group in which $R^{44}$ and $R^{45}$ are linked to form an oxygen atom-containing hydrocarbylene group include a morpholino group.

Examples of the nitrogen-containing heterocyclic group include a 4-pyridyl group and a 2-imidazolyl group.

Examples of a preferred hydrocarbyloxysilane compound in the present invention include a compound represented by Formula (4) in which $A^4$ is represented by Formula (4-A), namely, a compound represented by Formula (4-1):

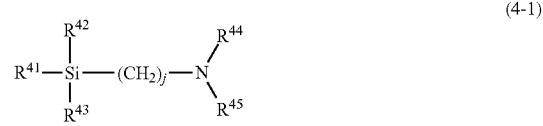

(4-1)

wherein $R^{41}$, $R^{42}$, and $R^{43}$ each independently represent a hydrocarbyl group or a hydrocarbyloxy group, at least one group selected from $R^{41}$, $R^{42}$ and $R^{43}$ is a hydrocarbyloxy groups; $R^{44}$ and $R^{45}$ each independently represent a hydrocarbyl group optionally having a substituent or a trihydrocarbylsilyl group, or $R^{44}$ and $R^{45}$ are linked to form a hydrocarbylene group optionally having a nitrogen atom and/or an oxygen atom; and j represents an integer of 1 to 5.

Of the compounds represented by Formula (4-1), examples of a compound in which $R^{44}$ and $R^{45}$ are hydrocarbyl groups, and $R^{41}$, $R^{42}$ and $R^{43}$ are hydrocarbyloxy groups include dialkylaminoalkyltrihydrocarbyloxysilane compounds such as 2-dimethylaminoethyltrimethoxysilane, 2-diethylaminoethyltrimethoxysilane, 3-dimethylaminopropyltrimethoxysilane, 3-diethylaminopropyltrimethoxysilane, 2-dimethylaminoethyltriethoxysilane, 2-diethylaminoethyltriethoxysilane, 3-dimethylaminopropyltriethoxysilane, and 3-diethylaminopropyltriethoxysilane.

Of the compounds represented by Formula (4-1), examples of a compound in which $R^{44}$ and $R^{45}$ are hydrocarbyl groups, two groups selected from $R^{41}$, $R^{42}$ and $R^{43}$ are hydrocarbyloxy groups, and the remaining one group is a hydrocarbyl group include dialkylaminoalkyldihydrocarbyloxyalkylsilane compounds such as 2-dimethylaminoethyldimethoxymethylsilane, 2-diethylaminoethyldimethoxymethylsilane, 3-dimethylaminopropyldimethoxymethylsilane, 3-diethylaminopropyldimethoxymethylsilane, 2-dimethylaminoethyldiethoxymethylsilane, 2-diethylaminoethyldiethoxymethylsilane, 3-dimethylaminopropyldiethoxymethylsilane, and 3-diethylaminopropyldiethoxymethylsilane.

Of the compounds represented by Formula (4-1), examples of a compound in which $R^{44}$ and $R^{45}$ are linked to form a hydrocarbylene group, and $R^{41}$, $R^{42}$ and $R^{43}$ are hydrocarbyloxy groups include (cyclic amino)alkyltrihydrocarbyloxysilane compounds such as pyrrolidinomethyltrimethoxysilane, piperidinomethyltrimethoxysilane, hexamethyleneiminomethyltrimethoxysilane, 2-pyrrolidinoethyltrimethoxysilane, 2-piperidinoethyltrimethoxysilane, 2-hexamethyleneiminoethyltrimethoxysilane, 3-pyrrolidinopropyltrimethoxysilane, 3-piperidinopropyltrimethoxysilane, 3-hexamethyleneiminopropyltrimethoxysilane, 3-pyrrolidinopropyltriethoxysilane, 3-piperidinopropyltriethoxysilane, and 3-hexamethyleneiminopropyltriethoxysilane.

Of the compounds represented by Formula (4-1), examples of a compound in which $R^{44}$ and $R^{45}$ are linked to form a nitrogen atom-containing hydrocarbylene group and $R^{41}$, $R^{42}$, and $R^{43}$ are hydrocarbyloxy groups include N-(2-trimethoxysilylethyl)imidazole, N-(2-trimethoxysilylethyl)-4,5-dihydroimidazole, N-(3-triethoxysilylpropyl)imidazole, and N-(3-triethoxysilylpropyl)-4,5-dihydroimidazole.

Of the compounds represented by Formula (4-1), examples of a compound in which $R^{44}$ and $R^{45}$ are linked to form an oxygen atom-containing hydrocarbylene group and $R^{41}$, $R^{42}$ and $R^{43}$ are hydrocarbyloxy groups include 2-morpholinoethyltrimethoxysilane and 3-morpholinopropyltrimethoxysilane.

Of the compounds represented by Formula (4-1), examples of a compound in which $R^{44}$ and $R^{45}$ are hydrocarbyl groups having a substituent, and $R^{41}$, $R^{42}$ and $R^{43}$ are hydrocarbyloxy groups include [bis(tetrahydrofuranyl)amino]alkyltrihydrocarbyloxysilane compounds such as 2-[di(tetrahydrofuranyl)amino]ethyltrimethoxysilane, 2-[di(tetrahydrofuranyl)amino]ethyltriethoxysilane, 3-[bis(3-tetrahydrofuranyl)amino]propyltrimethoxysilane, and 3-[bis(3-tetrahydrofuranyl)amino]propyltriethoxysilane.

Of the compounds represented by Formula (4-1), examples of a compound in which $R^{44}$ and $R^{45}$ are trialkylsilyl groups, two groups selected from $R^{41}$, $R^{42}$ and $R^{43}$ are hydrocarbyloxy groups, and the remaining group is a hydrocarbyl group include N,N-bis(trialkylsilyl)aminoalkylhydrocarbyloxysilane compounds such as 2-[N,N-bis(trimethylsilyl)amino]ethyldimethoxymethylsilane, 3-[N,N-bis(trimethylsilyl)amino]propyldimethoxymethylsilane, 2-[N,N-bis(trimethylsilyl)amino]ethyldiethoxymethylsilane, and 3-[N,N-bis(trimethylsilyl)amino]propyldiethoxymethylsilane.

The compound represented by Formula (4-1) is preferably a compound in which $R^{41}$, $R^{42}$ and $R^{43}$ are hydrocarbyloxy groups having 1 to 8 carbon atoms or hydrocarbyl groups having 1 to 8 carbon atoms, at least one group selected from $R^{41}$, $R^{42}$ and $R^{43}$ is a hydrocarbyloxy group having 1 to 8 carbon atoms, $R^{44}$ and $R^{45}$ are each a hydrocarbyl group having 1 to 8 carbon atoms or a trialkylsilyl group having 3 to 7 carbon atoms, or $R^{44}$ and $R^{45}$ are linked to form a hydrocarbylene group having 2 to 10 carbon atoms, and j is an integer of 1 to 5. More preferable is a compound in which $R^{41}$, $R^{42}$ and $R^{43}$ are alkoxy groups having 1 to 6 carbon atoms or alkyl groups having 1 to 6 carbon atoms, at least two of $R^{41}$, $R^{42}$ and $R^{43}$ are alkoxy groups having 1 to 6 carbon atoms, the remaining group is an alkyl group having 1 to 6 carbon atoms, $R^{44}$ and $R^{45}$ are each an alkyl group having 1 to 5 carbon atoms or a trialkylsilyl group having 3 to 7 carbon atoms in which the number of the carbon atoms of each alkyl group bound to a silicon atom is 1 to 4, or $R^{44}$ and $R^{45}$ are linked to form an alkanediyl group having 3 to 8 carbon atoms, and j is an integer of 1 to 5. More preferred is a compound in which $R^{41}$, $R^{42}$ and $R^{43}$ are alkoxy groups having 1 to 4 carbon atoms, $R^{44}$ and $R^{45}$ are each a linear alkyl group having 1 to 3 carbon atoms or a trimethylsilyl group, or $R^{44}$ and $R^{45}$ are bound to be a polymethylene group having 4 to 6 carbon atoms, and j is 2 or 3.

The compound represented by Formula (4-1) is particularly preferably 2-dimethylaminoethyltrimethoxysilane, 2-diethylaminoethyltrimethoxysilane, 3-dimethylaminopropyltrimethoxysilane, or 3-diethylaminopropyltrimethoxysilane.

The amount of the compound containing a nitrogen atom and a carbonyl group to be used is preferably 0.5 mmol or more, more preferably 1 mmol or more, per 100 g of the conjugated diene-based polymer. It is preferably 25 mmol or less, more preferably 10 mmol or less, even more preferably 5 mmol or less, per 100 g of the conjugated diene-based polymer.

In using a compound containing a nitrogen atom and a carbonyl group and a hydrocarbyloxysilane compound in combination, the total amount of them used is preferably 0.5 mmol or more, more preferably 1 mmol or more per 100 g of the conjugated diene-based polymer. It is preferably 25 mmol or less, more preferably 10 mmol or less, even more preferably 5 mmol or less, per 100 g of the conjugated diene-based polymer.

The temperature at which a product obtained by reacting the conjugated diene-based polymer with the organometallic compound is reacted with the compound containing a nitrogen atom and a carbonyl group and the hydrocarbyloxysilane compound is preferably 25° C. or higher, more preferably 35° C. or higher, further preferably 50° C. or higher. It is preferably 100° C. or lower, more preferably 90° C. or lower, even more preferably 80° C. or lower.

The time during which a product obtained by reacting the conjugated diene-based polymer with the organometallic compound is reacted with the compound containing a nitrogen atom and a carbonyl group and the hydrocarbyloxysilane compound is preferably 60 seconds or longer, more preferably 5 minutes or longer. The time is preferably 5 hours or shorter, more preferably 1 hour or shorter.

Preferably, the method for producing a modified conjugated diene-based polymer of the present invention has a step of obtaining a polymerization solution containing a conjugated diene-based polymer by a step of polymerizing monomer components containing a conjugated diene compound, a compound represented by Formula (1), and a compound represented by Formula (2) using an organometallic compound in a hydrocarbon solvent, and adding an organometallic compound to the resulting polymerization solution to react the conjugated diene-based polymer with the organometallic compound, and a step of adding a compound containing a nitrogen atom and a carbonyl group and a hydrocarbyloxysilane compound to a solution containing the product obtained in the foregoing step to react the product with the compound containing a nitrogen atom and a carbonyl group and the hydrocarbyloxysilane compound.

As a method for recovering the resulting modified conjugated diene-based polymer, a known method may be used, and examples thereof include a method of adding a coagulating agent to a solution containing a conjugated diene-based polymer, and a method of adding steam to a solution containing a conjugated diene-based polymer. The modified conjugated diene-based polymer recovered may be dried with a known drier such as a band drier or an extrusion-type drier.

[Modified Conjugated Diene-Based Polymer]

The Mooney viscosity ($ML_{1+4}$) of the modified conjugated diene-based polymer is preferably 10 or more, more preferably 20 or more in order to enhance tensile strength at break. In order to improve processability, it is preferably 200 or less, more preferably 150 or less. The Mooney viscosity ($ML_{1+4}$) is measured at 100° C. in accordance with JIS K6300 (1994).

The molecular weight distribution of the modified conjugated diene-based polymer is preferably from 1 to 5, more preferably from 1 to 2, in order to improve fuel economy. The molecular weight distribution is determined by measuring the number average molecular weight (Mn) and the weight average molecular weight (Mw) of the modified conjugated diene-based polymer by gel permeation chromatography (GPC), and then dividing Mw by Mn.

In order to improve fuel economy, the amount of vinyl bonds in the modified conjugated diene-based polymer is preferably 80% by mol or less, more preferably 70% by mol or less where the content of a monomer unit derived from a conjugated diene is taken as 100% by mol. In order to enhance gripping properties, the amount of vinyl bonds is preferably 10 mol % or more, more preferably 15 mol % or more, even more preferably 20 mol % or more, particularly preferably 40 mol % or more. The amount of vinyl bonds is determined from the absorption intensity at around $910\,cm^{-1}$, which is an absorption peak of a vinyl group, by infrared spectroscopy.

[Polymer Composition]

A polymer composition can be obtained by kneading a modified conjugated diene-based polymer with a polymer component different than the modified conjugated diene-based polymer, an additive, etc.

Examples of the polymer component different than the modified conjugated diene-based polymer include a styrene-butadiene copolymer, polybutadiene, a butadiene-isoprene copolymer, butyl rubber, natural rubber, an ethylene-propylene copolymer, and an ethylene-octene copolymer. Two or more polymer components different than the modified conjugated diene-based polymer may be used.

In the case of incorporating to a modified conjugated diene-based polymer a polymer component different than the modified conjugated diene-based polymer, the amount of the modified conjugated diene-based polymer to be incorporated is preferably 10% by weight or more, more preferably 20% by weight or more, where the total amount of the modified conjugated diene-based polymer and the polymer component different than the modified conjugated diene-based polymer is taken as 100% by weight, in order to enhance fuel economy. Hereafter, a modified conjugated diene-based polymer and a polymer component different than the modified conjugated diene-based polymer are sometimes collectively called polymer components.

Examples of the additive include a vulcanizing agent, a vulcanization accelerator, a vulcanization activator, an organic peroxide, a reinforcing agent, a filler, a silane coupling agent, an extending oil, a processing aid, an antiaging agent, and a lubricant.

Examples of the vulcanizing agent include sulfur. Examples of sulfur include powdery sulfur, precipitated sulfur, colloidal sulfur, insoluble sulfur, and highly-dispersible sulfur. The amount of the vulcanizing agent to be blended is preferably from 0.1 parts by weight to 15 parts by weight, more preferably from 0.3 parts by weight to 10 parts by weight, even more preferably from 0.5 parts by weight to 5 parts by weight per 100 parts by weight of the polymer components.

Examples of the vulcanization accelerator include thiazole-based vulcanization accelerators, such as 2-mercaptobenzothiazole, dibenzothiazyldisulfide, and N-cyclohexyl-2-benzothiazylsulfenamide; thiuram-based vulcanization accelerators, such as tetramethylthiurammonosulfide and tetramethylthiuramdisulfide; sulfenamide-based vulcanization accelerators, such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators, such as diphenylguanidine, diorthotolylguanidine, and orthotolylbiguanidine. The amount of the vulcanization accelerator to be blended is preferably 0.1 parts by weight to 5 parts by weight, more preferably 0.2 parts by weight to 3 parts by weight per 100 parts by weight of the polymer components.

Examples of the vulcanization activator include stearic acid and zinc oxide. Examples of the organic peroxide include dicumyl peroxide and di-tert-butyl peroxide.

Examples of the reinforcing agent include a silica-based reinforcing agent and carbon black.

Examples of the silica-based reinforcing agent include dry silica (anhydrous silicic acid), wet silica (hydrous silicic acid), colloidal silica, precipitated silica, calcium silicate, and aluminum silicate. One or more members thereof may be used. The BET specific surface area of the silica-based reinforcing agent is preferably from 50 $m^2/g$ to 250 $m^2/g$. The BET specific surface area is measured in accordance with ASTM D1993-03. As a commercially available product, there can be used, for example, a product available under the commercial name of Ultrasil VN3-G produced by Degussa GmbH, products available under the commercial names of VN3, AQ, ER, and RS-150 produced by Tosoh Silica Corporation, and products available under the commercial names of Zeosil 1115MP and Zeosil 1165MP produced by Rhodia.

Examples of the carbon black include channel carbon black such as EPC, MPC, and CC; furnace carbon black, such as SAF, ISAF, HAF, MAF, FEF, SRF, GPF, APF, FF, CF, SCF, and ECF; thermal carbon black, such as FT and MT; acetylene carbon black; and graphite. One or more members thereof may be used.

The nitrogen adsorption specific surface area ($N_2SA$) of carbon black is preferably from 5 $m^2/g$ to 200 $m^2/g$, and the dibutyl phthalate (DBP) absorption amount of carbon black is preferably from 5 ml/100 g to 300 ml/100 g. The nitrogen adsorption specific surface area is measured in accordance with ASTM D4820-93 and the DBP absorption amount is measured in accordance with ASTM D2414-93. As a commercially available product, a product available under the commercial name of DIABLACK N339 produced by Mitsubishi Chemical Corporation, products available under the commercial names of SEAST 6, SEAST 7HM, and SEAST KH produced by Tokai Carbon Co., Ltd., and products available under the commercial names of CK 3 and Special Black 4A produced by Degussa GmbH can be used.

When a polymer composition is produced by incorporating a reinforcing agent in a modified conjugated diene-based polymer, the amount of the reinforcing agent to be incorporated is preferably from 10 parts by weight to 150 parts by weight per 100 parts by weight of a conjugated diene-based polymer. In order to enhance abrasion resistance and strength, the amount to be incorporated is more preferably 20 parts by weight or more, even more preferably 30 parts by weight or more. In terms of the dispersibility of the reinforcing agent, the amount to be incorporated is more preferably 120 parts by weight or less, even more preferably 100 parts by weight or less.

When a polymer composition is produced by incorporating a reinforcing agent in a modified conjugated diene-based polymer, it is preferred to use a silica-based reinforcing agent as the reinforcing agent in order to enhance fuel economy. The amount of the silica-based reinforcing agent to be incorporated is preferably 50% by weight or more, more preferably 70% by weight or more where the amount of all reinforcing agents to be incorporated is taken as 100% by weight.

It is preferred to use a silica-based reinforcing agent and carbon black as reinforcing agents. The weight ratio of the silica-based reinforcing agent to the carbon black in the reinforcing agents (the content of silica-based reinforcing agent: the content of carbon black) is preferably from 2:1 to 50:1. In order to enhance fuel economy and enhance reinforcing properties, the weight ratio is more preferably from 5:1 to 20:1.

Examples of the filler include calcium carbonate, talc, alumina, clay, aluminum hydroxide, and mica.

Examples of the silane coupling agent include vinyltrichlorosilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl) tetrasulfide, γ-trimethoxysilylpropyldimethylthiocarbamyltetrasulfide, and γ-trimethoxysilylpropylbenzothiazyltetrasulfide. One or more members of these are used. As a commercially available product, products available under commercial names of Si69 and Si75 produced by Degussa GmbH can be used.

When a polymer composition is produced by incorporating a silica-based reinforcing agent and a silane coupling agent in a modified conjugated diene-based polymer, the amount of the silane coupling agent to be incorporated is preferably from 1 part by weight to 20 parts by weight, more preferably from 2 parts by weight to 15 parts by weight, even more preferably from 5 parts by weight to 10 parts by weight per 100 parts by weight of the silica-based reinforcing agent.

Examples of the extending oil include aromatic mineral oils (viscosity-gravity constant (V.G.C.): from 0.900 to 1.049), naphthene-based mineral oils (V.G.C.: from 0.850 to 0.899), and paraffin-based mineral oils (V.G.C.: from 0.790 to 0.849). The content of a polycyclic aromatic compound in the extending oil is preferably less than 3% by weight, more preferably less than 1% by weight. The content of the polycyclic aromatic compound is measured in accordance with the IP 346/92 method of The Institute of Petroleum. The content of aromatic compounds (CA) of the extending oil is preferably 20% by weight or more. Two or more extending oils may be used.

Examples of a method for producing a polymer composition by incorporating to a modified conjugated diene-based polymer a polymer component other than the modified conjugated diene-based polymer, an additive, etc. include a method of kneading them by using a kneading machine. Examples of the kneading machine include a roll kneading machine and a Banbury mixer.

As far as the kneading conditions be concerned, when an additive other than a vulcanizing agent is incorporated, the kneading temperature is usually from 50° C. to 200° C., preferably from 80° C. to 190° C., and when a vulcanizing agent is incorporated, the kneading temperature is usually 100° C. or lower, preferably from room temperature to 80° C. The kneading time is usually from 30 seconds to 30 minutes, preferably from 1 minute to 30 minutes. A composition with a vulcanizing agent incorporated therein is usually used after being subjected to vulcanization treatment such as press vulcanization. The vulcanization temperature is usually from 120° C. to 200° C., preferably from 140° C. to 180° C.

The polymer composition obtained in the present invention is superior in fuel economy and is suitably used for tires.

EXAMPLES

Evaluation of physical properties was performed by the following methods.

1. Mooney Viscosity ($ML_{1+4}$)

In accordance with JIS K6300 (1994), the Mooney viscosity of a polymer was measured at 100° C.

2. Amount of Vinyl Bonds (Unit: mol %)

The amount of the vinyl bonds in a polymer was determined from the absorption intensity at around 910 $cm^{-1}$, which is an absorption peak of a vinyl group, by infrared spectroscopy.

3. Content of Monomer Units Derived from Styrene (Unit: % by Weight)

The content of the monomer units derived from styrene in a polymer was determined from a refractive index in accordance with JIS K6383 (1995).

4. Molecular Weight Distribution (Mw/Mn)

The weight average molecular weight (Mw) and the number average molecular weight (Mn) were measured by a gel permeation chromatograph (GPC) method under the following conditions (1) to (8), and the molecular weight distribution (Mw/Mn) of the polymer was determined.

(1) Apparatus: HLC-8220 manufactured by Tosoh Corporation
(2) Separation column: TSKgel SuperHM-H (two columns in series) manufactured by Tosoh Corporation
(3) Measuring temperature: 40° C.
(4) Carrier: tetrahydrofuran
(5) Flow rate: 0.6 mL/min
(6) Injection amount: 5 μL
(7) Detector: differential refractometer
(8) Molecular weight standard: standard polystyrene 5. Content of Monomer Units Derived from 4-Methylstyrene (Unit: % by Weight)

The content of the monomer units derived from 4-methylstyrene in a polymer was determined by a gas chromatograph-mass spectrometer (GC-MS) method under the following conditions (1) to (5).

(1) Apparatus: GCMS-QP2010 Plus manufactured by Shimadzu Corporation (2) Column: Agilent J&W DB-5 ms, 30 m×0.25 mm i.d., membrane thickness 0.25 μm
(3) Temperature conditions: 40° C. (2 minutes)-10° C./min-320° C. (5 minutes)
(4) Ionizing method: electron ionization (EI method: 70 eV)
(5) Measuring method: selected ion monitoring (SIM)

6. Fuel Economy

A strip of 4 mm in width, 40 mm in length and 1.2 mm in thickness was punched out from a vulcanized sheet and was subjected to a test. The loss tangent (tan δ (70° C.)) of the strip at a temperature of 70° C. was measured under the condition represented by a strain of 1% and a frequency of 10 Hz by using a viscoelasticity analyzer (manufactured by Ueshima Seisakusho Co., Ltd.). The smaller this value, the better the fuel economy is.

7. Gripping Property

A strip of 4 mm in width, 40 mm in length and 1.2 mm in thickness was punched out from a vulcanized sheet and was subjected to a test. The loss tangent (tan δ (0° C.)) of the strip at a temperature of 0° C. was measured under the condition represented by a strain of 2.5% and a frequency of 10 Hz by using a viscoelasticity analyzer (manufactured by Ueshima Seisakusho Co., Ltd.). The larger this value, the better the gripping property is.

Example 1

A polymerization reactor made of stainless steel equipped with a stirring device of an internal volume of 20 L was washed, dried, and flushed with dry nitrogen. Subsequently, 10.2 kg of industrial hexane (density 680 kg/m³), 608 g of 1,3-butadiene, 192 g of styrene, 1.51 g of 4-methylstyrene, 6.1 ml of tetrahydrofuran, and 4.4 ml of ethylene glycol diethyl ether were charged into the polymerization reactor. Subsequently, a solution of n-butyllithium in n-hexane (n-butyllithium content 14.81 mmol) was charged into the polymerization reactor, and then a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours while 1,3-butadiene and styrene were continuously fed to the polymerization reactor. The fed amount of 1,3-butadiene was 912 g, and the fed amount of styrene was 288 g.

After 20 minutes from the polymerization initiation, 20 mL of a solution containing 1.51 g of 4-methylstyrene in hexane was rapidly charged into the polymerization reactor at a polymerization temperature of 65° C. and a stirring rate of 130 rpm.

After 40 minutes from that (after 60 minutes from the polymerization initiation), 20 ml of a solution containing 1.51 g of 4-methylstyrene in hexane was rapidly charged into the polymerization reactor at a polymerization temperature of 65° C. and a stirring rate of 130 rpm.

After 2 hours from that (after 3 hours from polymerization initiation), 20 ml of a hexane solution containing 1.3 ml of 1-butanol was added to the polymer solution, and the polymer solution was stirred for 15 minutes.

Subsequently, a solution of sec-butyllithium in cyclohexane (sec-butyllithium content 63.95 mmol), and 11.5 ml of 1,1,2,2-tetramethylethylenediamine were charged into the polymerization reactor, followed by stirring for 30 minutes.

Further, 63.95 mmol of N-phenyl-2-pyrrolidone was added, followed by stirring for 15 minutes.

To the polymer solution was added 20 ml of a solution containing 3.0 ml of methanol in hexane, and the polymer solution was stirred for 5 minutes. Subsequently, to the polymer solution were added 8.0 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 4.0 g of pentaerythrityltetrakis(3-laurylthiopropionate) (trade name: Sumilizer TP-D produced by Sumitomo Chemical Co., Ltd.), subsequently the polymer solution was allowed to evaporate at normal temperature for 24 hours, and further was dried at 55° C. for 12 hours under reduced pressure to afford a polymer. Evaluation results of the polymer are shown in Table 1.

Subsequently, 100 parts by weight of the resulting polymer, 78.4 parts by weight of silica (trade name: Ultrasil VN3-G produced by Degussa GmbH), 6.4 parts by weight of a silane coupling agent (trade name: Si69 produced by Degussa GmbH), 6.4 parts by weight of carbon black (trade name: DIABLACK N339 produced by Mitsubishi Chemical Corporation), 47.6 parts by weight of an extending oil (trade name: JOMO Process NC-140 produced by Japan Energy Corporation), 1.5 parts by weight of an antiaging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CZ produced by Sumitomo Chemical Co., Ltd.), 1 part by weight of a vulcanization accelerator (trade name: Soxinol D produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was heated to vulcanize at 160° C. for 45 minutes to prepare a vulcanized sheet. The results of physical property evaluation of the vulcanized sheet are shown in Table 1.

Example 2

A polymerization reactor made of stainless steel equipped with a stirring device of an internal volume of 20 L was washed, dried, and flushed with dry nitrogen. Subsequently, 10.2 kg of industrial hexane (density 680 kg/m3), 608 g of 1,3-butadiene, 192 g of styrene, 3.02 g of 4-methylstyrene, 6.1 ml of tetrahydrofuran, and 4.4 ml of ethylene glycol diethyl ether were charged into the polymerization reactor. Subsequently, a solution of n-butyllithium in n-hexane (n-butyllithium content 14.81 mmol) was charged into the polymerization reactor, and then a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours while 1,3-butadiene and styrene were continuously fed to the polymerization reactor. The fed amount of 1,3-butadiene was 912 g, and the fed amount of styrene was 288 g.

After 20 minutes from the polymerization initiation, 20 mL of a solution containing 3.02 g of 4-methylstyrene in hexane was rapidly charged into the polymerization reactor at a polymerization temperature of 65° C. and a stirring rate of 130 rpm.

After 40 minutes from that (after 60 minutes from the polymerization initiation), 20 ml of a solution containing 3.02 g of 4-methylstyrene in hexane was rapidly charged into the polymerization reactor at a polymerization temperature of 65° C. and a stirring rate of 130 rpm.

After 2 hours from that (after 3 hours from polymerization initiation), 20 ml of a hexane solution containing 1.3 ml of 1-butanol was added to the polymer solution, and the polymer solution was stirred for 15 minutes.

Subsequently, a solution of sec-butyllithium in cyclohexane (sec-butyllithium content 76.75 mmol), and 13.7 ml of 1,1,2,2-tetramethylethylenediamine were charged into the polymerization reactor, followed by stirring for 30 minutes.

Further, 38.37 mmol of N-phenyl-2-pyrrolidone and 38.37 mmol of 3-dimethylaminopropyltrimethoxysilane were added, followed by stirring for 15 minutes.

To the polymer solution was added 20 ml of a solution containing 3.0 ml of methanol in hexane, and the polymer solution was stirred for 5 minutes. Subsequently, to the polymer solution were added 8.0 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 4.0 g of pentaerythrityltetrakis(3-laurylthiopropionate) (trade name: Sumilizer TP-D produced by Sumitomo Chemical Co., Ltd.), the polymer solution was then allowed to evaporate at normal temperature for 24 hours, and further was dried at 55° C. for 12 hours under reduced pressure to afford a polymer. Evaluation results of the polymer are shown in Table 1.

One hundred parts by weight of the resulting polymer, 78.4 parts by weight of silica (trade name: Ultrasil VN3-G produced by Degussa GmbH), 6.4 parts by weight of a silane coupling agent (trade name: Si69 produced by Degussa GmbH), 6.4 parts by weight of carbon black (trade name: DIABLACK N339 produced by Mitsubishi Chemical Corporation), 47.6 parts by weight of an extending oil (trade name: JOMO Process NC-140 produced by Japan Energy Corporation), 1.5 parts by weight of an antiaging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CZ produced by Sumitomo Chemical Co., Ltd.), 1 part by weight of a vulcanization accelerator (trade name: Soxinol D produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was heated to vulcanize at 160° C. for 45 minutes to prepare a vulcanized sheet. The results of physical property evaluation of the vulcanized sheet are shown in Table 1.

Example 3

A polymerization reactor made of stainless steel equipped with a stirring device of an internal volume of 20 L was washed, dried, and flushed with dry nitrogen. Subsequently, 10.2 kg of industrial hexane (density 680 kg/m$^3$), 608 g of 1,3-butadiene, 192 g of styrene, 1.51 g of 4-methylstyrene, 6.1 ml of tetrahydrofuran, and 4.4 ml of ethylene glycol diethyl ether were charged into the polymerization reactor. Subsequently, a solution of n-butyllithium in n-hexane (n-butyllithium content 14.81 mmol) was charged into the polymerization reactor, and then a polymerization reaction was initiated.

A copolymerization reaction of 1,3-butadiene, styrene, and 4-methylstyrene was performed at a temperature in the polymerization reactor of 65° C. and a stirring rate of 130 rpm for 3 hours while 1,3-butadiene and styrene were continuously fed to the polymerization reactor. The fed amount of 1,3-butadiene was 912 g, and the fed amount of styrene was 288 g.

After 20 minutes from the polymerization initiation, 20 mL of a solution containing 1.51 g of 4-methylstyrene in hexane was rapidly charged into the polymerization reactor at a polymerization temperature of 65° C. and a stirring rate of 130 rpm.

After 40 minutes from that (after 60 minutes from the polymerization initiation), 20 ml of a solution containing 1.51 g of 4-methylstyrene in hexane was rapidly charged into the polymerization reactor at a polymerization temperature of 65° C. and a stirring rate of 130 rpm.

After 2 hours from that (after 3 hours from polymerization initiation), 20 ml of a hexane solution containing 1.3 ml of 1-butanol was added to the polymer solution, and the polymer solution was stirred for 15 minutes.

Subsequently, a solution of sec-butyllithium in cyclohexane (sec-butyllithium content 63.95 mmol), and 11.5 ml of 1,1,2,2-tetramethylethylenediamine were charged into the polymerization reactor, followed by stirring for 30 minutes.

Further, 63.95 mmol of 1,3-dimethyl-2-imidazolidinone was added, followed by stirring for 15 minutes.

To the polymer solution was added 20 ml of a solution containing 3.0 ml of methanol in hexane, and the polymer solution was stirred for 5 minutes. Subsequently, to the polymer solution were added 8.0 g of 2-tert-butyl-6-(3-tert-butyl-2-hydroxy-5-methylbenzyl)-4-methylphenyl acrylate (trade name: Sumilizer GM produced by Sumitomo Chemical Co., Ltd.), and 4.0 g of pentaerythrityltetrakis(3-laurylthiopropionate) (trade name: Sumilizer TP-D produced by Sumitomo Chemical Co., Ltd.), the polymer solution was then allowed to evaporate at normal temperature for 24 hours, and further was dried at 55° C. for 12 hours under reduced pressure to afford a polymer. Evaluation results of the polymer are shown in Table 1.

One hundred parts by weight of the resulting polymer, 78.4 parts by weight of silica (trade name: Ultrasil VN3-G produced by Degussa GmbH), 6.4 parts by weight of a silane coupling agent (trade name: Si69 produced by Degussa GmbH), 6.4 parts by weight of carbon black (trade name: DIABLACK N339 produced by Mitsubishi Chemical Corporation), 47.6 parts by weight of an extender oil (trade name: JOMO Process NC-140 produced by Japan Energy Corporation), 1.5 parts by weight of an antiaging agent (trade name: Antigen 3C produced by Sumitomo Chemical Co., Ltd.), 2 parts by weight of stearic acid, 2 parts by weight of zinc flower, 1 part by weight of a vulcanization accelerator (trade name: Soxinol CZ produced by Sumitomo Chemical Co., Ltd.), 1 part by weight of a vulcanization accelerator (trade name: Soxinol D produced by Sumitomo Chemical Co., Ltd.), 1.5 parts by weight of a wax (trade name: Sunnoc N produced by Ouchi Shinko Chemical Industrial Co., Ltd.), and 1.4 parts by weight of sulfur were kneaded with a laboplast mill to prepare a polymer composition. The resulting polymer composition was shaped into a sheet with a 6 inch roll, and the sheet was heated to vulcanize at 160° C. for 45 minutes to prepare a vulcanized sheet. The results of physical property evaluation of the vulcanized sheet are shown in Table 1.

TABLE 1

|  |  | Example 1 | Example 2 | Example 3 |
|---|---|---|---|---|
| Mooney viscosity | — | 37.8 | 64.7 | 37.9 |
| Amount of vinyl bonds | mol % | 56.9 | 57.0 | 56.3 |
| Content of monomer units derived from styrene | % by weight | 24.6 | 24.7 | 24.9 |
| Content of monomer units derived from 4-methyl-styrene | % by weight | 0.21 | 0.43 | 0.21 |
| Fuel economy tanδ (70° C.) | — | 0.193 | 0.126 | 0.139 |
| Gripping property tanδ (0° C.) | — | 0.678 | 0.705 | 0.701 |

What is claimed is:

1. A method for producing a modified conjugated diene-based polymer, the method comprising:

a step of reacting a conjugated diene-based polymer having monomer units derived from a conjugated diene compound, monomer units derived from a compound represented by Formula (1), and monomer units derived from a compound represented by Formula (2), with an organometallic compound to obtain a resulting product, and a step of reacting the resulting product and a compound containing a nitrogen atom and a carbonyl group, wherein the conjugated diene-based polymer comprises the monomer units derived from the compound represented by Formula (1) in a content of from 0.01% by weight to 10% by weight where the total amount of all the monomer units contained in the conjugated diene-based polymer is taken as 100% by weight;

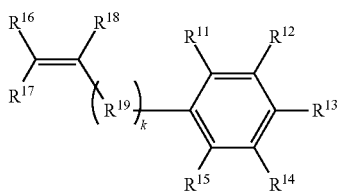

(1)

wherein $R^{11}$, $R^{12}$, $R^{13}$, $R^{14}$ and $R^{15}$ each independently represent a hydrogen atom or an alkyl group; at least one group selected from $R^{11}$, $R^{12}$, $R^{13}$, $R^{14}$ and $R^{15}$ is an alkyl group; $R^{16}$, $R^{17}$ and $R^{18}$ each independently represent a hydrogen atom or a hydrocarbyl group; $R^{19}$ represents a hydrocarbylene group; k is 0 or 1,

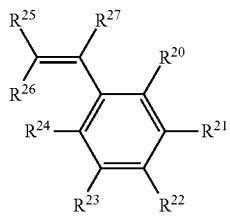

(2)

wherein the compound represented by Formula (2) consists of carbon atoms and hydrogen atoms; $R^{20}$, $R^{21}$, $R^{22}$, $R^{23}$ and $R^{24}$ are all hydrogen atoms or two or more groups selected from $R^{20}$, $R^{21}$, $R^{22}$, $R^{23}$ and $R^{24}$ are linked to form one or more rings consisting of carbon atoms including the carbon atoms to which the groups are attached and each of the rest of $R^{20}$, $R^{21}$, $R^{22}$, $R^{23}$ and $R^{24}$ is a hydrogen atom; $R^{25}$, $R^{26}$ and $R^{27}$ each independently represent a hydrogen atom or a hydrocarbyl group, wherein the compound containing a nitrogen atom and a carbonyl group is a compound represented by the following Formula (3);

$$\begin{array}{c} R^{31} \\ \diagdown \\ N{-}(R^{33}){-}_{p}{-}\underset{\underset{O}{\|}}{C}{-}R^{34} \\ \diagup \\ R^{32} \end{array} \quad (3)$$

wherein $R^{31}$ and $R^{32}$ are each independently a hydrocarbyl group optionally having a substituent and $R^{34}$ represents a hydrocarbyl group optionally having a substituent, or a hydrogen atom, or $R^{31}$ and $R^{32}$ are linked to form a hydrocarbylene group optionally having a nitrogen atom and/or an oxygen atom and $R^{34}$ represents a hydrocarbyl group optionally having a substituent, or $R^{31}$ and $R^{34}$ are linked to form a hydrocarbylene group optionally having a nitrogen atom and/or an oxygen atom and $R^{32}$ represents a hydrocarbyl group optionally having a substituent; $R^{33}$ represents a divalent group and p represents 0 or 1.

2. A method for producing a polymer composition, the method comprising a step of kneading 100 parts by weight of a modified conjugated diene-based polymer produced by the method according to claim 1 with from 10 to 150 parts by weight of a reinforcing agent.

* * * * *